US010614436B1

(12) United States Patent
Sharma et al.

(10) Patent No.: US 10,614,436 B1
(45) Date of Patent: Apr. 7, 2020

(54) ASSOCIATION OF MOBILE DEVICE TO RETAIL TRANSACTION

(71) Applicants: Rajeev Sharma, State College, PA (US); Joonhwa Shin, State College, PA (US); Youngrock Yoon, Knoxville, TN (US); Donghun Kim, State College, PA (US)

(72) Inventors: Rajeev Sharma, State College, PA (US); Joonhwa Shin, State College, PA (US); Youngrock Yoon, Knoxville, TN (US); Donghun Kim, State College, PA (US)

(73) Assignee: VideoMining Corporation, State College, PA (US)

( * ) Notice: Subject to any disclaimer, the term of this patent is extended or adjusted under 35 U.S.C. 154(b) by 372 days.

(21) Appl. No.: 15/247,324

(22) Filed: Aug. 25, 2016

(51) Int. Cl.
*G06Q 20/20* (2012.01)
*G06Q 10/10* (2012.01)
*G06Q 20/12* (2012.01)
*G06K 9/00* (2006.01)
*G06F 16/51* (2019.01)
*G06F 16/583* (2019.01)
*G06F 16/58* (2019.01)

(52) U.S. Cl.
CPC .......... *G06Q 20/202* (2013.01); *G06F 16/51* (2019.01); *G06F 16/5854* (2019.01); *G06F 16/5866* (2019.01); *G06K 9/00288* (2013.01); *G06Q 10/10* (2013.01); *G06Q 20/12* (2013.01)

(58) Field of Classification Search
None
See application file for complete search history.

(56) References Cited

U.S. PATENT DOCUMENTS

| | | | |
|---|---|---|---|
| 8,340,453 B1 * | 12/2012 | Chen | G06T 5/002 382/254 |
| 8,392,957 B2 | 5/2013 | Holt et al. | |
| 8,436,911 B2 | 5/2013 | Leebow | |
| 8,622,286 B2 | 1/2014 | Gazdzinski | |
| 8,831,294 B2 | 9/2014 | Krupka et al. | |
| 8,891,835 B2 | 11/2014 | Cheswick | |
| 9,033,226 B1 | 5/2015 | Gazdzinski | |

(Continued)

OTHER PUBLICATIONS

D. Lemire, "Faster Retrieval with a Two-Pass Dynamic-Time-Warping Lower Bound," Pattern Recognition 42(9):2169-2180 (2009), Jun. 10, 2009, 26 pages.

*Primary Examiner* — Fateh M Obaid

(57) ABSTRACT

A method and system for associating a mobile device carried by a shopper with Point-of-Sale (PoS) data from that shopper's transaction at a retail location. Specifically, the association can utilize face data that was associated with the mobile device to match face data that was generated by association with PoS data. The association with a mobile device can also include the calculation of a mobile trajectory to enable the generation of a shopper profile including shopper behavior. The mobile to PoS association can include tracking of the mobile device throughout a retail location to form a trajectory. The association of a face to a mobile device can utilize the device's MAC address and repeat visit analysis to determine a match. The association of a face to PoS data can utilize the aligning of event time series based on a dynamic time disparity to match checkout events with PoS events.

16 Claims, 45 Drawing Sheets

(56) References Cited

U.S. PATENT DOCUMENTS

| | | | |
|---|---|---|---|
| 9,135,500 B2 | 9/2015 | Steiner | |
| 9,609,211 B2* | 3/2017 | Hwang | H04N 5/23238 |
| 2003/0205620 A1* | 11/2003 | Byun | G06K 7/1096 |
| | | | 235/462.14 |
| 2004/0061787 A1* | 4/2004 | Liu | H04N 5/232 |
| | | | 348/218.1 |
| 2006/0038009 A1* | 2/2006 | Russell | A47F 9/04 |
| | | | 235/383 |
| 2009/0003662 A1 | 1/2009 | Joseph et al. | |
| 2009/0252383 A1 | 10/2009 | Adam et al. | |
| 2011/0013810 A1 | 1/2011 | Engström et al. | |
| 2012/0078700 A1* | 3/2012 | Pugliese, III | G06Q 30/02 |
| | | | 705/14.25 |
| 2013/0027561 A1* | 1/2013 | Lee | G06Q 30/02 |
| | | | 348/150 |
| 2013/0030875 A1* | 1/2013 | Lee | G06Q 10/06311 |
| | | | 705/7.38 |
| 2013/0108114 A1 | 5/2013 | Aviad et al. | |
| 2013/0259327 A1 | 10/2013 | Cheswick | |
| 2014/0172627 A1* | 6/2014 | Levy | G06Q 30/0631 |
| | | | 705/26.7 |
| 2014/0379480 A1 | 12/2014 | Rao et al. | |
| 2015/0242980 A1 | 8/2015 | Henry et al. | |
| 2015/0363798 A1 | 12/2015 | Aihara et al. | |
| 2016/0253656 A1* | 9/2016 | Dragushan | G06Q 20/3226 |
| | | | 705/71 |
| 2016/0321666 A1* | 11/2016 | Dragushan | G06K 9/00536 |
| 2018/0018601 A1* | 1/2018 | Wansink | G06Q 10/0635 |
| 2019/0108551 A1* | 4/2019 | Chow | G06K 9/00899 |

* cited by examiner

Candidate Faces # of Visits: 4

Appearance %: 4/4    2/4    1/4    1/4    1/4    1/4    1/4    1/4    1/4    1/4

Visit 5:

Iteration 1: Mapping - Offset

3810

Iteration 3: Outlier Removal (10%) & Mapping - Offset

3812

Iteration 5: Outlier Removal (10%) & Mapping - Offset

3814

Iteration 7: Outlier Removal (10%) & Mapping - Offset

3816 time ⟶

Iteration 9: Outlier Removal (10%) & Mapping - Offset

3910

Iteration 11: Outlier Removal (10%) & Mapping - Offset

3912

Iteration 13: Final Alignment

3914 time ⟶

ASSOCIATION OF MOBILE DEVICE TO RETAIL TRANSACTION

BACKGROUND

Retailers can track shoppers in their store and retail locations via multiple modalities. One modality is to detect the presence of a mobile device carried by the shopper. Sensors deployed in the retail location can use signals from the mobile device to recognize the duration of the shopper's trip. A mobile device can also contain a unique identifier (such as a MAC address) that can be used determine when that mobile device (and therefore the shopper) returns to a retail location. While there is value in detecting the presence of a shopper in a retail location, there is a need to associate the presence (and trajectory) of a mobile device with the transaction data from the shopping trip.

BRIEF SUMMARY

A method and system for associating a mobile device with Point-of-Sale (PoS) data utilizing at least a camera, at least a mobile signal sensor, and at least a processor for the association comprising the following steps: detecting the presence of a mobile device using a mobile signal sensor and tracking the movements of the mobile device as a shopper carrying the device moves throughout a location using a Mobile Signal-based Tracking module, associating at least an image of the face of a shopper with the mobile device using a Face-to-Mobile Association module, associating at least an image of the face of a shopper with PoS transaction data using a Face-to-PoS Association module, storing data captured by Mobile Signal-based Tracking module, Face-to-Mobile Association module, and Face-to-PoS Association module in a database, and associating the mobile device to the PoS data using a Mobile-to-PoS Association module.

An embodiment can include a module for tracking the movements of a mobile device, carried by a shopper, as the shopper moves throughout a store or other retail location. The tracking module can identify a mobile device by use of a unique identification such as the MAC address. The module can track the movements of the device to form a trajectory.

Another embodiment can include a module for associating the physically identifiable feature (PIF) of an individual person with the ID of a mobile device carried by the person by means of a repeat visit analysis without any explicit or voluntary participation of the person, for example, in a form of providing their information by participation in a survey. The PIF of a person can include the face of the person that is assumed to be unique enough to be used as an ID for the person. The face can specifically be used as an exemplary representation of the PIF of a person, but the PIF is not limited to the face only.

A typical scenario where the embodiment can be applied can include a case where a plurality of individuals visit repeatedly at least one of the physical spaces where a set of sensors can capture the visual appearance of a person and another set of sensors can capture the signal transmitted from the mobile device carried by the person. By analyzing data collected during the repeated visits, an association can be made to match the visual appearance (for example, facial features) of a person with the ID of the mobile device.

Another embodiment can include a module that can generate an event time series containing facial recognition data for a person or persons during the PoS transaction process. This data can form a vision-based checkout event time series. The embodiment can also collect PoS transaction data from the retail checkout system, using timestamp information to create a second event time series. The time series can then be aligned in order to match events from one time series to the other. Faces identified in checkout events in the first event time series can be registered to PoS events in the second event time series and the results stored in a database.

Another embodiment can include a module that can utilize data from the previously described modules that can be stored in a database to associate a mobile device to a PoS transaction. The module can use face data that was associated with the mobile device to match face data that was generated by association with PoS data. The association with a mobile device can also include the association with a mobile trajectory to enable the generation of a shopper profile including shopper behavior.

DETAILED DESCRIPTION

In the following description, numerous specific details are set forth. However, it is understood that embodiments of the invention may be practiced without these specific details. In other instances, well-known circuits, structures and/or techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Further, while the steps provided are presented in a particular order, the process is not limited to the particular ordering of steps presented. Some embodiments may include steps in the same or different order than the steps provided in the process description.

System Deployment and Overview

Figure 1:
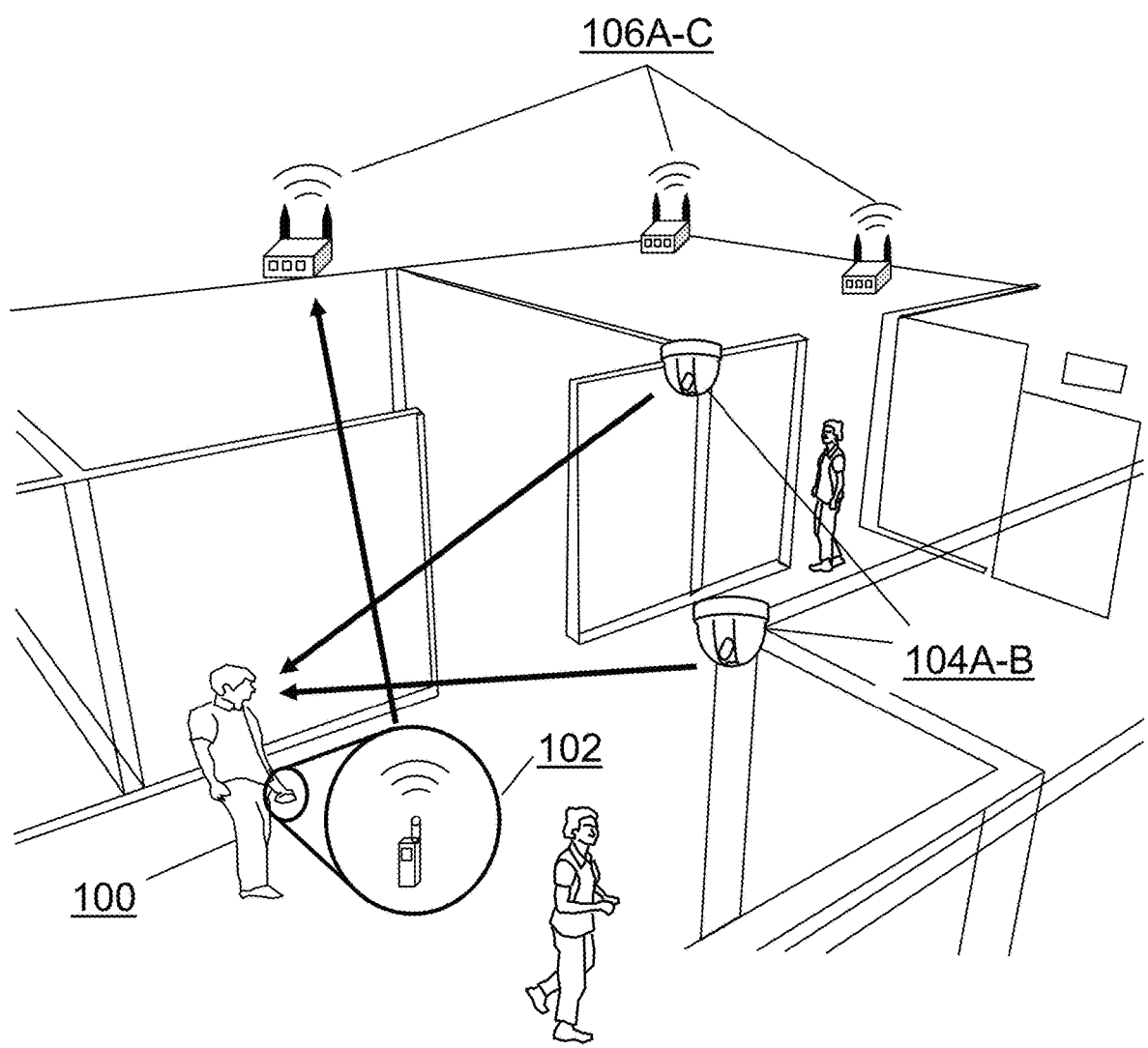
FIG. 1 shows an exemplary application of an embodiment in a physical location.

FIG. 1 shows an overview of an application where an exemplary embodiment is deployed and used at a physical space at a location. The physical space can be covered by a set of cameras 104A-B in such a way that the cameras can capture the faces of the persons present in the physical space. In some cases, the best place to capture the faces of the persons at the location is at an entrance and/or exit to the physical space, since everyone may pass through a relatively narrow pathway and/or doors, and all faces tend to be directed toward a single direction. In some embodiments, one or more cameras can be placed near the checkout area of the retail store to capture faces of persons in the checkout queue. In this example, the cameras 104A-B can capture the faces of the persons present, including a person 100 carrying a mobile device 102. The presence of the mobile device 102 carried by the person 100 can be detected by one or more of the access points (APs) (or any mobile signal sensors that is capable of sensing mobile radio signals including WiFi and Bluetooth) 106A-C, when the mobile device 102 is within range of one or more of the APs 106A-C.

Figure 2:
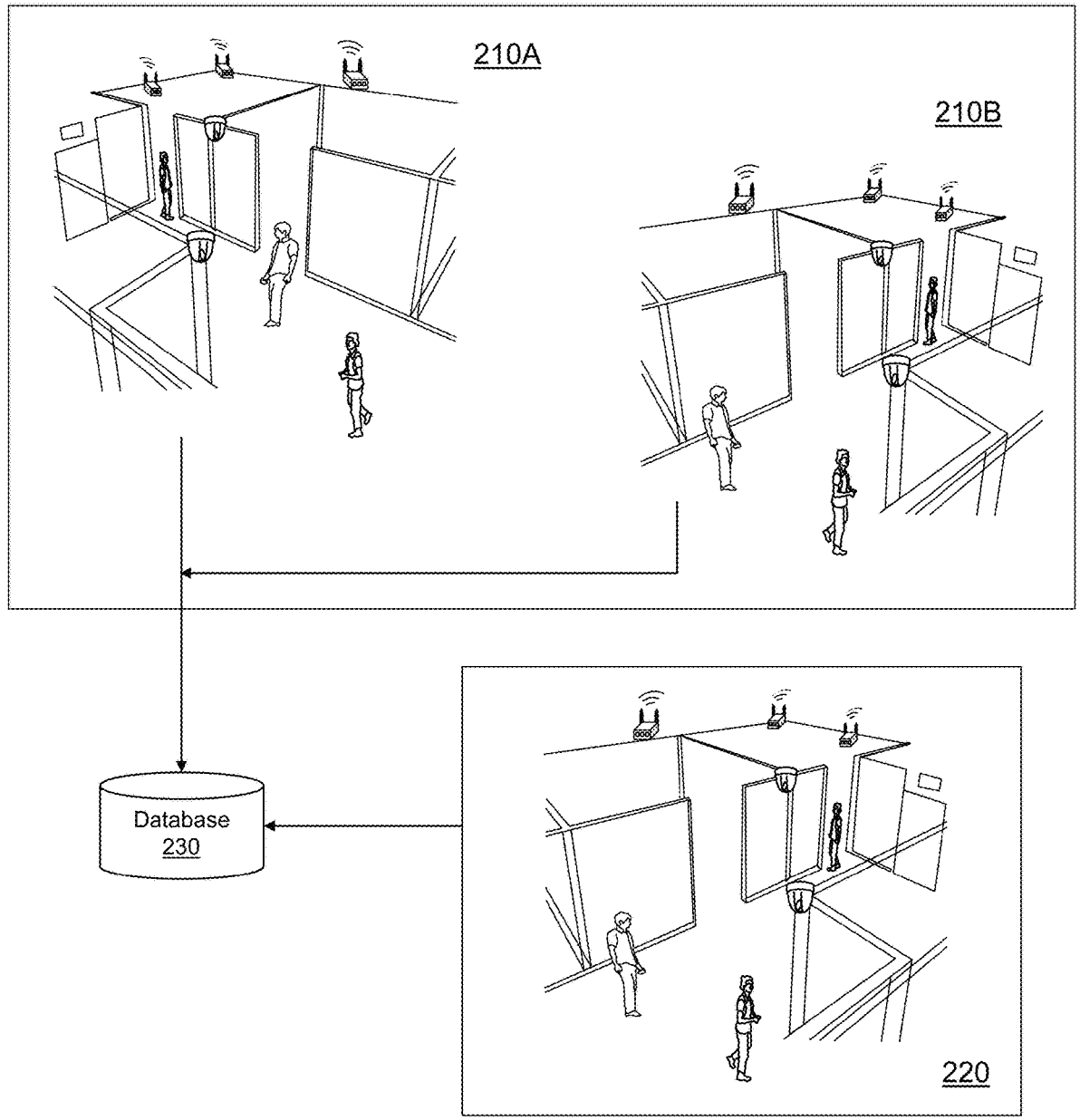
FIG. 2 shows an exemplary application of an embodiment at multiple physical locations in a geographic area.

While the deployment illustrated in FIG. 1 shows a single physical space at a single location, FIG. 2 shows example embodiments that can include multiple similar deployments of cameras. In an embodiment, a single or multiple deployment of cameras, such as in 104A-B, and APs, such as in 106A-C, can be placed at physical spaces (e.g., Door 1 and Door 2) within a particular location (e.g., Office A), as shown in 210A and 210B. Further, in another embodiment, a single or multiple deployment of cameras, such as in 104A-B, and APs, such as in 106A-C, can be placed at different locations (e.g., Office A and Shopping Mall B), as shown in 220. In either case, data from the different locations can be transmitted via a network to a common computing system for storage in a database 230 and processing. So, given these embodiments, the exemplary deployment can occur as a single instance at a single location, as multiple instances at a single location, or as multiple instances across multiple locations.

Figure 3:
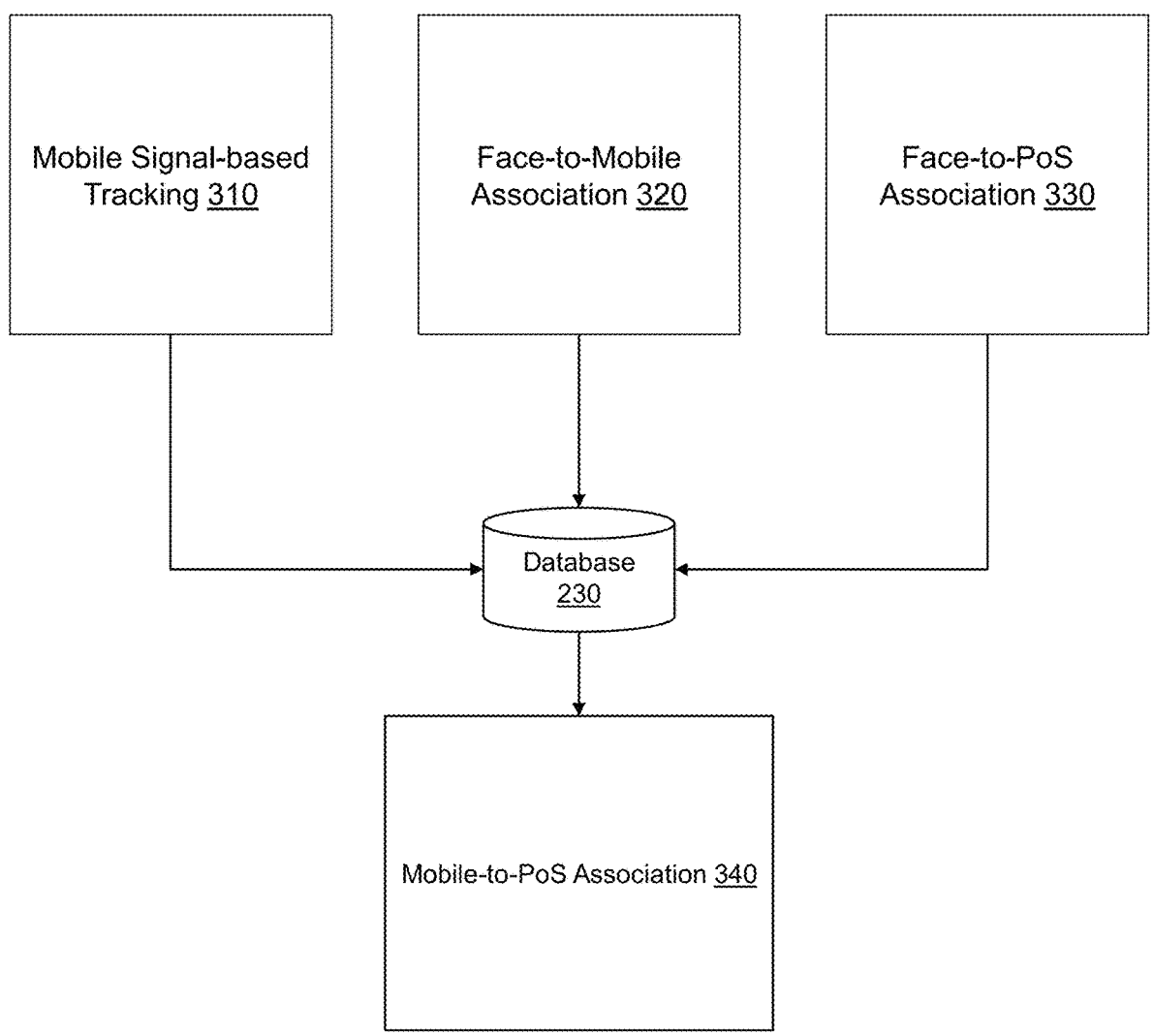
FIG. 3 shows an example block flow diagram for the data association process.

FIG. 3 shows a block flow diagram overview of an exemplary embodiment of the data association process. The process can consist of several modules that contribute information to the Database 230. One can be the Mobile Signal-based Tracking 310 module. This module can detect and track a mobile device as the person carrying that device moves throughout the retail location. This tracking can result in the formation of a mobile device trajectory representing the person's entire trip through the store. The module can isolate individual mobile device tracks using the unique MAC address of each tracked device, and use methods such as translateration to localize the device.

Figure 4:
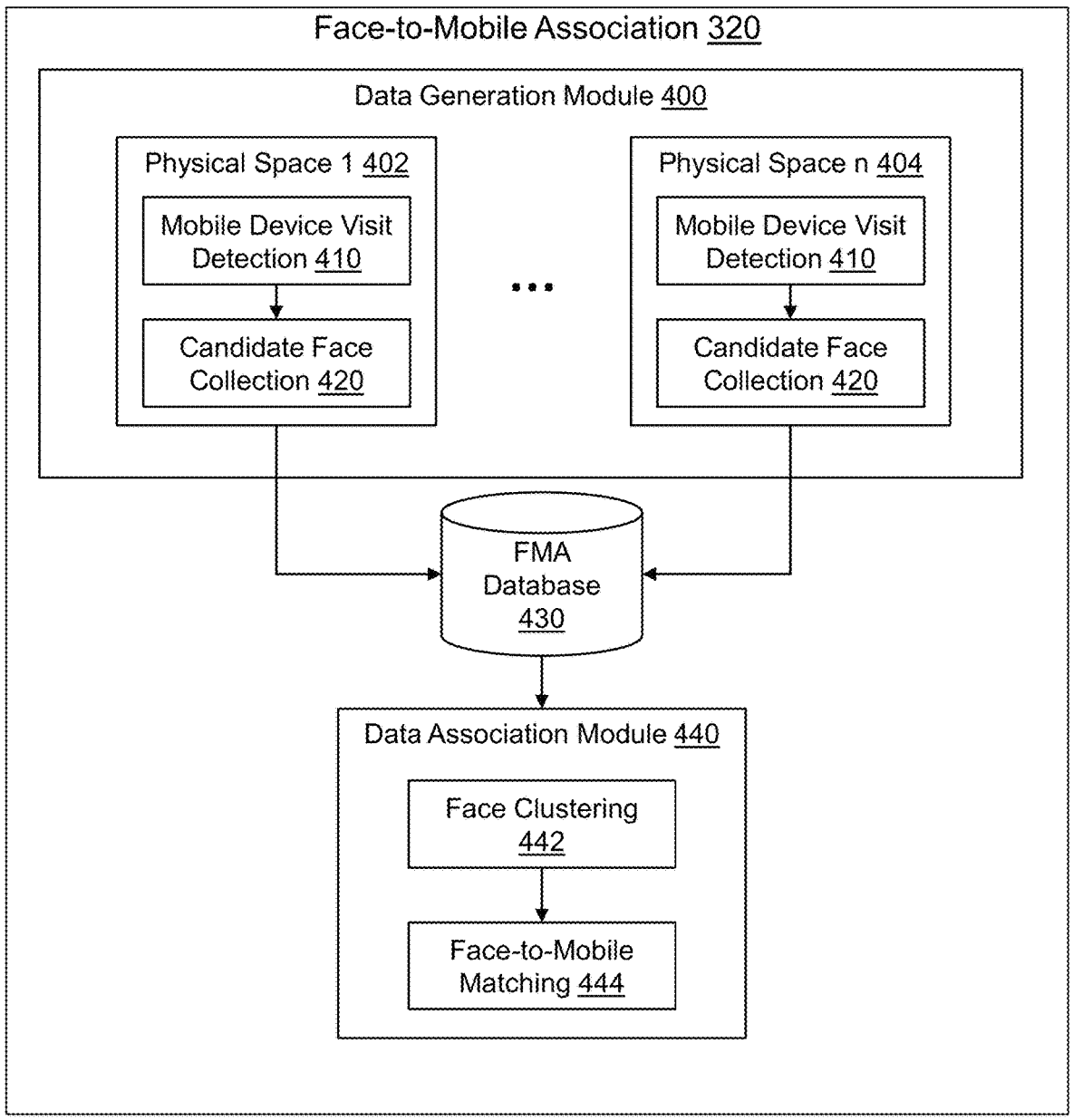
FIG. 4 shows an example block flow diagram for the Face-to-Mobile Association module.

FIG. 4 shows that for each physical space 402 and 404, the Face-to-Mobile Association 320 module can detect the presence of a mobile device 102. When a device is within the range of an AP, the AP can capture a signal from the mobile device using the Mobile Device Visit Detection 410 module. The signal from the mobile device can also include a unique identifier from the mobile device. In a preferred embodiment, the unique identifier detected by the AP of the mobile device can be the MAC address of a radio in the mobile device, including Bluetooth, WiFi, Nearfield Communication (NFC), and some other identification. In addition to the MAC address, the Data Generation Module 400 can record a time stamp indicating the time or range of time when the device was present and detectable.

Further, during the range of time when a mobile device is detected, the Candidate Face Collection 420 module can capture images of the faces of persons present in the physical space. The captured images can also include a time stamp indicating the time when the image was captured. The actual location of the faces when captured may also be collected as meta-data so that the face location and/or time information can be later used when being associated with a mobile device.

Mobile signal and image data from each of the physical spaces created by the Data Generation Module 400 can be stored in the FMA Database 430. The Data Association Module 440 can access data from the FMA Database 430 in order to match face images to the captured MAC address. Face images that are similar can be clustered into groups by the Face Clustering 442 module. Finally, the most probable match of a face group for each captured MAC address can be identified using the Face-to-Mobile Matching 444 module.

Figure 5:
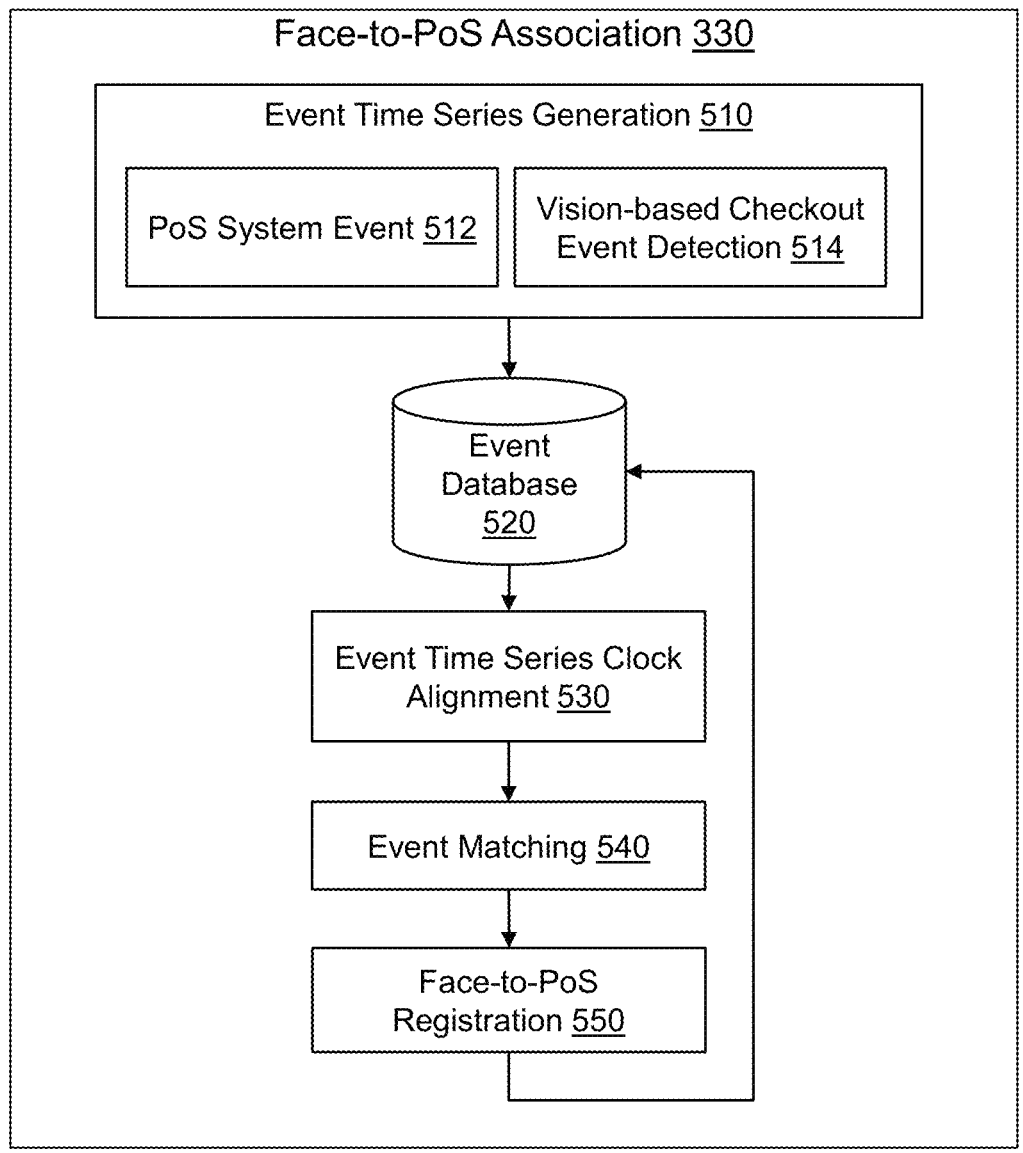
FIG. 5 shows an example block flow diagram for the Face-to-PoS Association module.

FIG. 5 shows more details of the Face-to-PoS Association 330 module. This module can associate images of faces of people in the checkout queue with transaction (PoS) data. The process can begin with the generation of two event time series (ETSes) using the Event Time Series Generation 510 module. One event time series (ETS) can be generated using the PoS System Event 512 module, which can comprise a list of shopper transactions at a retail location along with a timestamp for each transaction. Another ETS can be generated using the Vision-based Checkout Event Detection 514 module. The Vision-based Checkout Event Detection 514 module can detect and track the faces of a shopper in the checkout line or making a purchase at the checkout area of a retail location. In addition, it can detect when a transaction has taken place. When tracking multiple faces in the checkout line, it can create groups of faces based on the time the persons leave the checkout area (for example, possibly indicating a family or group of friends shopping together). Further, it can make a determination of which tracked person in a group of persons was the transaction owner (i.e., the person who completed the purchase transaction; this is described in more detail below). An ETS can also include timestamps corresponding to the times when the purchases occurred, or when a shopper or a group of shoppers left the checkout area. Both types of ETS data can then be stored in an Event Database 520.

Both types of ETSes can then be processed by the Event Time Series Clock Alignment 530 module to determine an alignment of the timing information between the two ETSes. This alignment can be performed using a discrete or continuous Dynamic Time Warping (DTW)-like approach, or some other method. The alignment can be used to find correspondences between events on the sets of ETSes.

After the ETSes are aligned, the Event Matching 540 module can be used to determine a probability that events from each ETS are matched. A match can be an indication that the corresponding events from each ETS occurred at the same (or a similar) time.

Finally, given matched events on each ETS, the Face-to-PoS Registration 550 module can associate a face group with each PoS event. In some embodiments, a tree-like graph can be created to associate groups of faces from multiple persons with the same PoS event. This association can indicate the presence of a family, or other social group, that might shop together on other occasions. After registration of the face group to the PoS event, the data can then be used to update the Event Database 520.

Data from the Mobile Signal-based Tracking 310 module, Face-to-Mobile Association 320, and Face-to-PoS Association 330 modules can be stored in the Database 230. Then, the Mobile-to-PoS Association 340 module can match the trajectory of each tracked mobile device with the PoS transaction data associated with that device.

More details about each of the modules will be provided below.

Mobile Tracking

Figure 6:
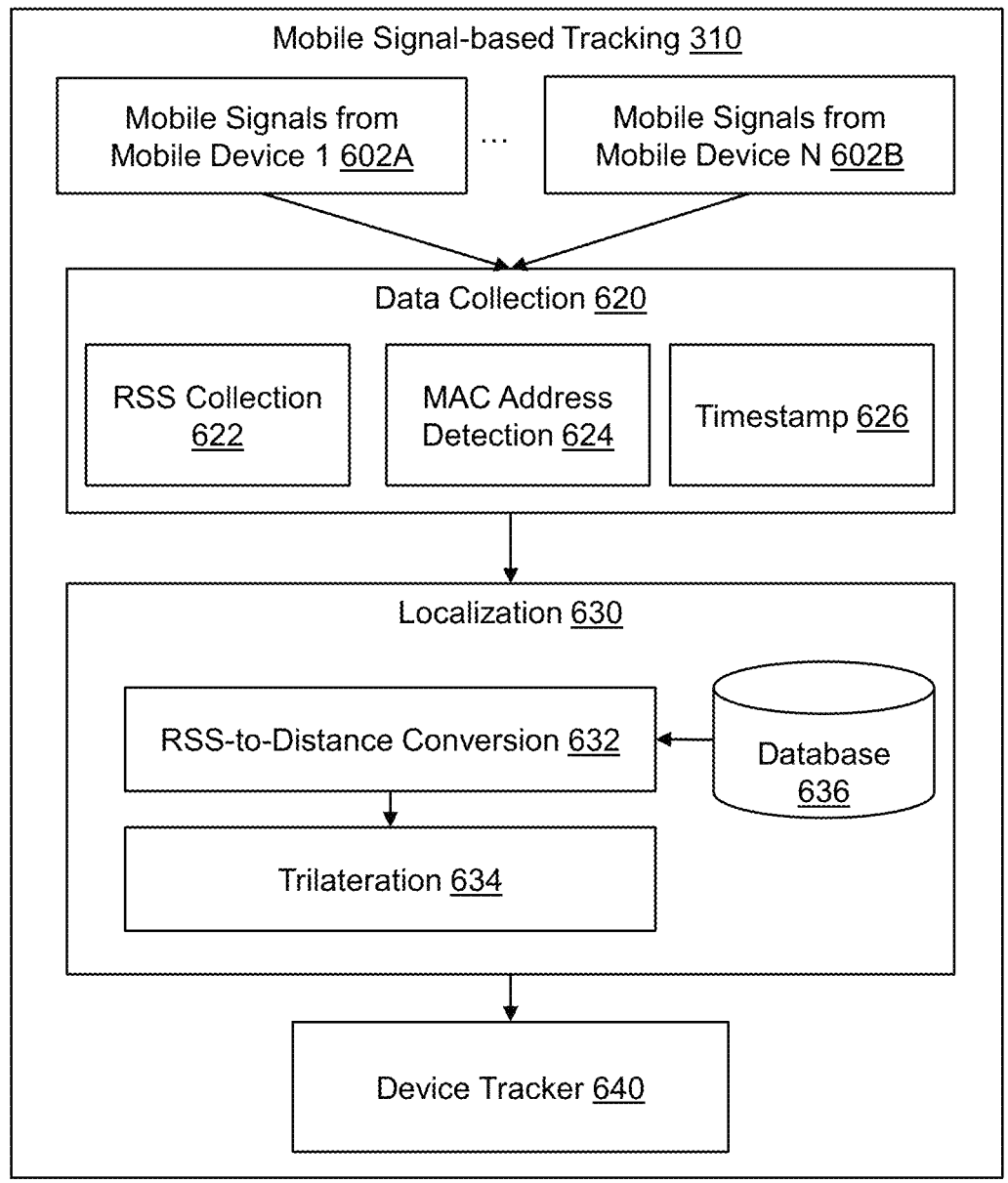
FIG. 6 shows an example block flow diagram for the Mobile Signal-based Tracking module.

FIG. 6 shows an embodiment of the Mobile Signal-based Tracking 310 module (illustrated in this example for a single physical space). In addition to detecting the presence of a mobile device and its associated MAC address, an embodiment can track the location of a person carrying a mobile device as they travel the physical space. The tracking of the mobile device and use of location information can improve the performance of the data association process by associating the calculated location of the mobile device with the known location of a camera and its field of view.

FIG. 1 shows an exemplary embodiment for Wi-Fi sensor deployment. For Wi-Fi based tracking, we can also assume that a set of Wi-Fi signal sensors 106 A-C, which will also be referred to as access points (i.e., mobile signal sensors) or simply APs, can be deployed in an area of interest where the sensing range of the set of APs 106 A-C can cover the area with a certain sensing density p, where the sensing density p is defined as the level of overlap of the sensing range of the APs 106 A-C of the area. If an area is covered by APs 106 A-C with a density p, then it can mean that any point in the area is covered by at least p number of APs at any time. The value of p can be determined differently depending on the employed algorithms and environments. For example, for trilateration based Wi-Fi device localization schemes, p could be at least three while for triangulation based ones, p could be at least two. In a preferred embodiment where trilateration can be used as a localization method, the APs 106 A-C are usually deployed with the value of p being four, which is empirically determined to be a balanced tradeoff between cost and robustness.

The deployed APs 106 A-C can be calibrated in terms of Received Signal Strength-to-distance, RSS-to-distance, or radio fingerprint-to-location mapping. Both RSS-to-distance and radio fingerprint-to-location mapping are methods well-known in the art. FIG. 6 shows an exemplary block flow diagram of the Mobile Signal-based Tracking 310 module. In one embodiment, localization 630 can be calculated using an RSS-to-distance mapping function in the RSS-to-Distance Conversion module 632. Due to the wireless signal propagation characteristics, the power of the signal decreases as the source of the signal gets farther. The relationship between the RSS and the distance from the source can be estimated by constructing a mapping function based on a set of ground truth measurements. Using the RSS-to-distance mapping function in the RSS-to-Distance Conversion module 632, a trilateration-based localization 634 can be performed if there are at least three RSS measurements available for a person at a given time instant. The RSS-to-distance mapping function in the RSS-to-Distance Conversion module 632 may be learned without any prior data if a self-calibration method is employed, which takes advantage of already-known locations of APs and their signals that are stored in a Database 636. In another embodiment, a radio fingerprint for an area of interest can be generated using a set of measurements from multiple APs for a Wi-Fi source at known positions. The radio fingerprint-to-location mapping can be used to localize a source of Wi-Fi signals.

A computing machine and APs 106 A-C can track the mobile signals 602 A-B of persons of interest in the Mobile Signal-based Tracking 310 module. Given N number of APs 106 A-C deployed in an area of interest with a certain density p, each AP can be constantly searching for wireless signals 602 A-B of interest in a certain channel or multiple channels simultaneously if equipped with multiple radios. The AP with a single radio may hop over different channels to detect such mobile signals 602 A-B that could be transmitted from mobile devices present in the area. APs 106 A-C can search for mobile signals 602 A-B because mobile devices are likely to look for an AP for potential connection that may be initiated in the near future if the user of the mobile device attempts to use a wireless connection.

To get and maintain a list of nearby APs 106 A-C, most mobile devices 102 usually perform a type of AP discovery process if their radio is turned on. The mobile devices tend to transmit a short packet periodically (i.e., Probe Request in the 802.11 standard) with a certain time interval between transmissions to discover accessible APs nearby. The time interval depends on the type of the operating system (OS) of the mobile device (e.g., iOS, Android, etc.) and the current state of the mobile device in terms of, for instance, whether the applications of the mobile device are currently running actively or in background, or whether the display of the mobile device is on or off. In general, if the display of a mobile device is on, then the OS puts the device in an active state, resulting in the interval getting shorter and transmission rate being increasing. If the display is off, then the OS would gradually put the device into a sleep state through multiple stages.

Once mobile signals 602A-B (typically in the form of packets) are transmitted from a mobile device 102 via wireless communications, then a subset of APs 106 A-C around the mobile device can detect the packets if the APs happen to be listening at the same or an adjacent channel. The APs 106 A-C at an adjacent channel may be able to detect the packet since a Wi-Fi channel spectrum spans wider than the frequency width allocated for a channel. When a packet is detected at an AP 106 A-C, a data collection 620 process can occur where the PHY layer and MAC layer information of the packet can be retrieved which can include the Received Signal Strength (RSS) 622 and the MAC address 624 while a timestamp 626 of the packet detection can be marked in the Data Collection module 620. The value of the RSS may be available in terms of the RSS Indicator (RSSI), and this value may vary significantly even during a short time period due to various signal distortions and interferences. To reduce such noise and variation, the RSS values may undergo a noise reduction process during a set of consecutive receptions. In case of multiple mobile devices present, the unique MAC address 624 or ID of mobile devices 102 can be used to filter and aggregate the measurements separately for each individual mobile device.

In the localization 630 method, the values of the RSS readings can be converted to a real-world distance from each AP 106 A-C by utilizing the pre-learned RSS-to-distance mapping function for each AP 106 A-C in the RSS-to-Distance Conversion module 632, which could be stored in a database 636. If there are distance measurements from at least three different APs 106 A-C available, then a single location can be estimated by, for example, employing a trilateration-based approach 634. The estimated current location can then be fed into a tracker (e.g., Kalman filter and Particle filter) with the unique ID, the MAC address 624, so that the optimal current location and thus trajectory can be estimated in a stochastic framework in the mobile Device Tracker 640 module. The trajectory along with the specific MAC address can then be stored in the Database 230.

Face-to-Mobile Association Module

Figure 7:
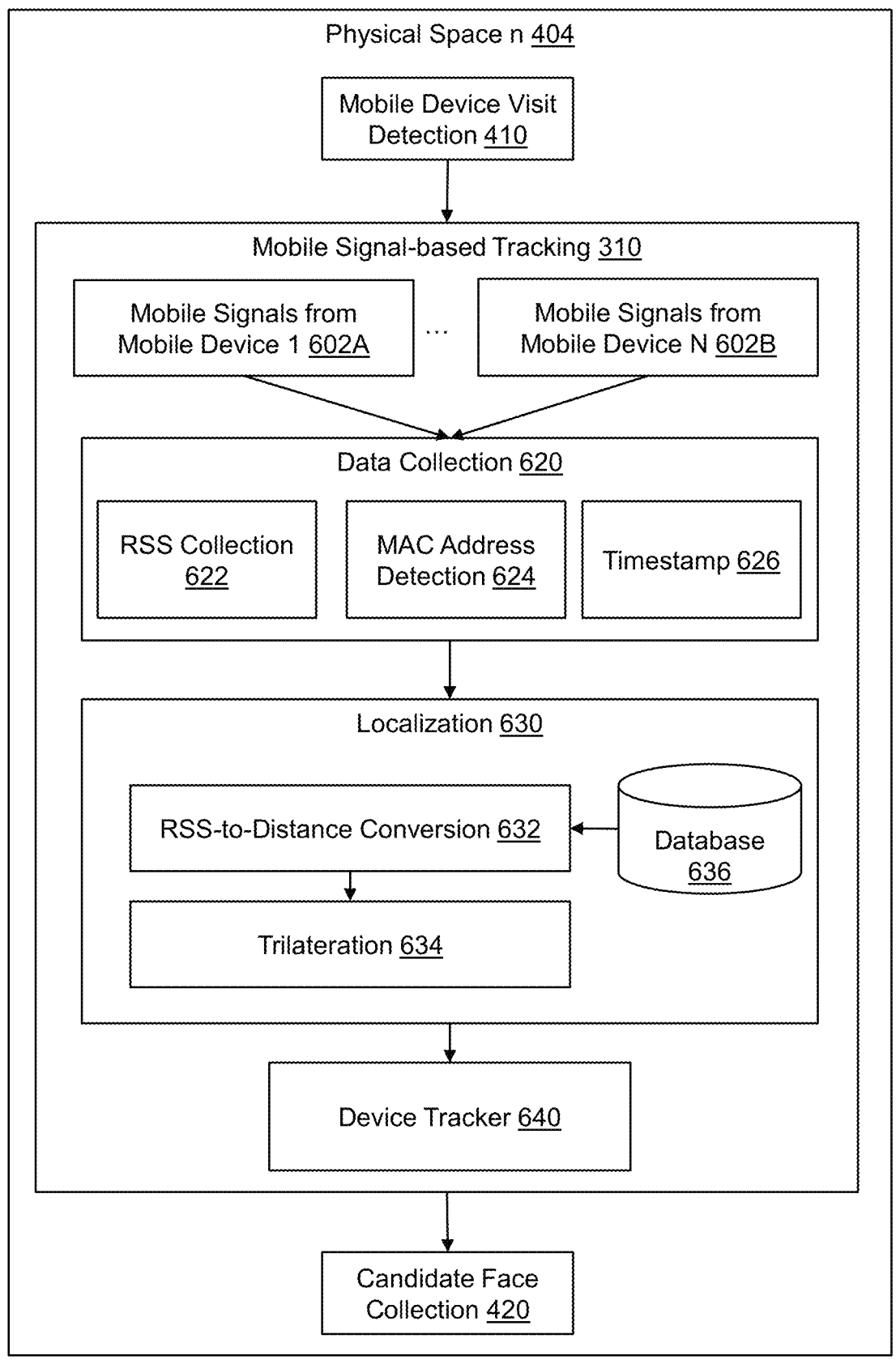
FIG. 7 shows an embodiment of the Data Generation Module that includes the Mobile Signal-based Tracking module.

FIG. 7 shows an embodiment of the Data Generation Module 400 that includes a Mobile Signal-based Tracking 310 module (illustrated in this example for a single Physical Space n 404; the Mobile Signal-based Tracking 310 module can be implemented as described in the previous section). In addition to detecting the presence of a mobile device and its associated MAC address, an embodiment can track the location of a person carrying a mobile device as they travel the physical space. The tracking of the mobile device and use of location information can improve the performance of the data association process by associating the calculated location of the mobile device with the known location of a camera and its field of view.

Figure 8:
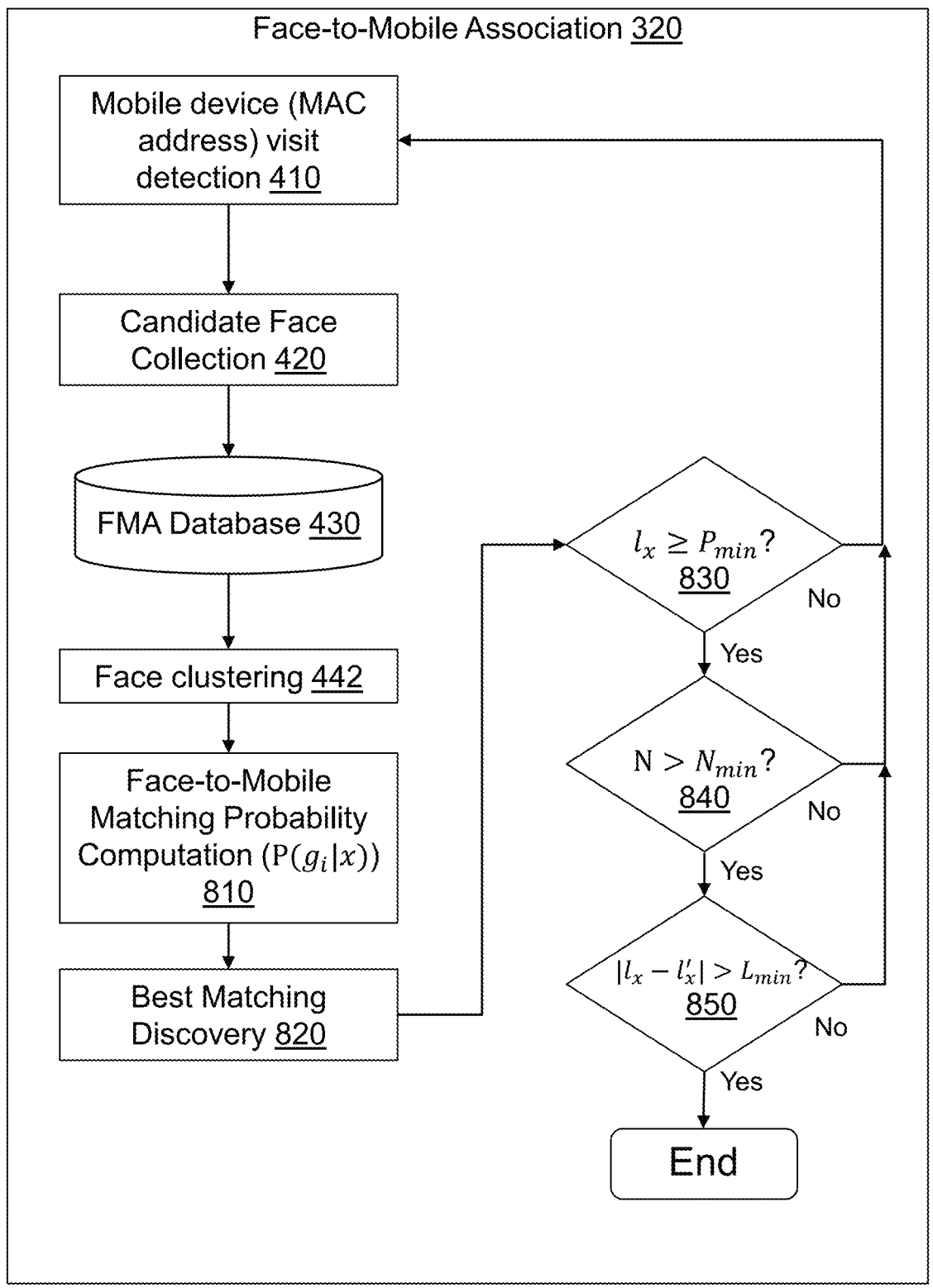
FIG. 8 shows an example process flow diagram for the Face-to-Mobile Association process.

FIG. 8 provides a process flow diagram for an embodiment of the Face-to-Mobile Association 320 module.

The Face-to-Mobile Association 320 process can begin by defining X to be the MAC address of a mobile device 102 carried by a person 100. For the $i^{th}$ visit of a MAC address x to a physical space during a range of time, $[t_{in}, t_{out}]$, as detected using the Mobile Device Visit Detection module 410, and as illustrated in FIG. 1, a set of face images $f_i$ of persons can be collected (by the Candidate Face Collection 420 module) who also visited the physical space at time t, where $t_{in}-\Delta t < t < t_{out}+\Delta t$:

$$f_i = \{f_{i1}, f_{i2}, \ldots, f_{iv_i}\},$$

where $v_i$ can be the number of faces captured at t, where $t_{in}-\Delta t < t < t_{out}+\Delta t$.

It can be noted that $f_{ij}$ (where $1 \leq j \leq v_i$) may be a single face for a person $s_j$ or a set of faces of the same person $s_j$ captured using a face tracker.

The range of time when faces can be captured, $[t_{in}-\Delta t, t_{out}+\Delta t]$, corresponds to the time when the APs can detect a mobile device having the particular MAC address. As detection of the mobile device by the APs may not occur instantaneously (for example, a mobile device may only broadcast its presence once every several seconds) as the device enters the area, the $\Delta t$ term may be included to account for those detection delays. Further, the time t can be a single instant of time, or many instances of time within the time period that the mobile device is detected by the APs.

When the time period $[t_{in}, t_{out}]$ associated with the visit by a mobile device having a particular MAC address is completed, candidate face images that were captured during the period $[t_{in}-\Delta t, t_{out}+\Delta t]$ can be collected by a face detection and tracking algorithm within the Candidate Face Collection 420 module. Then, all the candidate faces collected during the period $[t_{in}-\Delta t, t_{out}+\Delta t]$ can be stored in the FMA Database 430.

Figure 9:
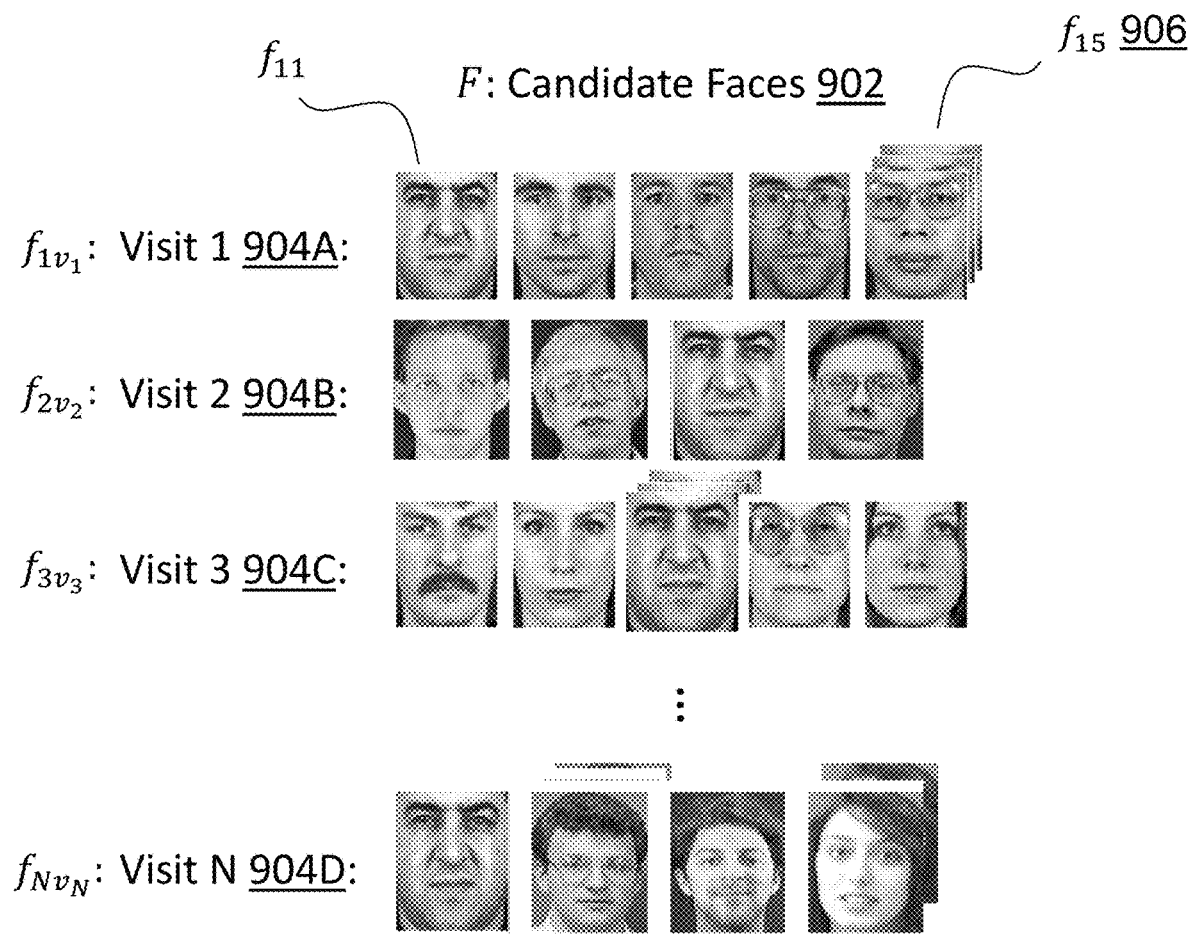
FIG. 9 shows an exemplary set of candidate faces for multiple visits of a MAC address.

Next, as illustrated in FIG. 9, a union of the candidate face sets 902, $F=\{f_1, f_2, \ldots, f_N\}$, can be constructed, where N is the total number of visits associated with the MAC address x. The candidate faces associated with each visit 904A-D by a particular MAC address can form the rows of the figure. The union of faces can comprise the faces captured across all of the rows.

Note that if an element in $f_i$ represents a set of faces for the same person (since they are collected by a face tracker), then such face subgroups (that are already determined to correspond to the same person) could be maintained throughout the following face clustering process as if they are the same face. The face subgroup $f_{15}$ 906 in FIG. 9 is an example for that, where three faces for the same person can be captured and collected together by a face tracker.

Figure 10:
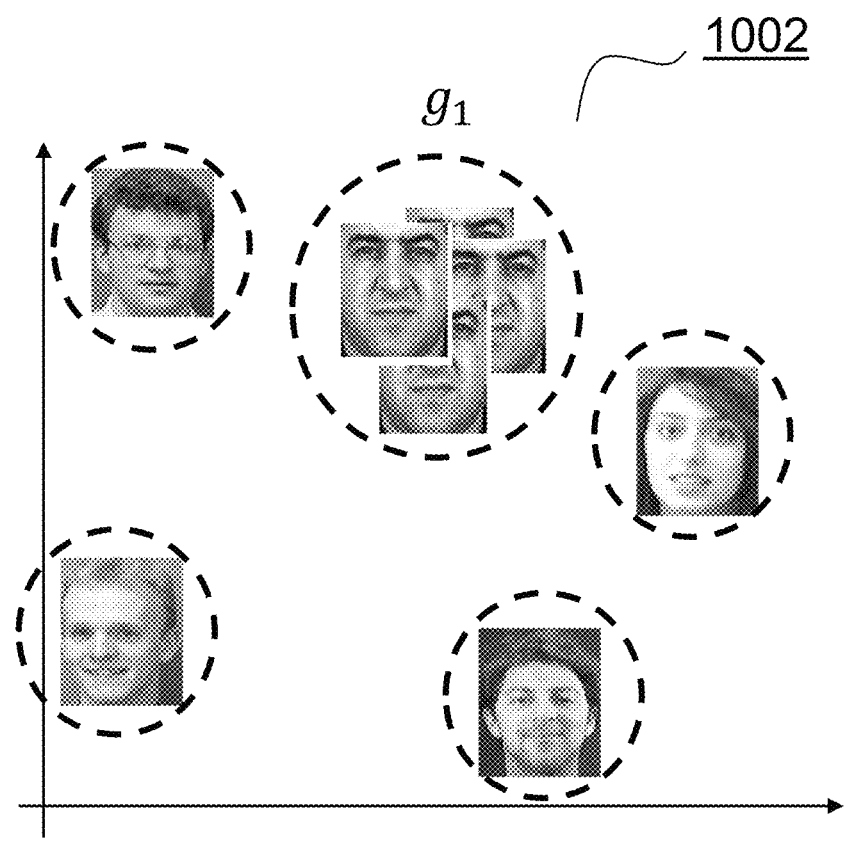
FIG. 10 shows example output of the Face Clustering module.

Next, as illustrated in FIG. 10, the face sets can be clustered into multiple groups 1002 based on the similarity of the faces in a feature space by a clustering operator T(•), using the Face Clustering 442 module. M can denote the total number of clusters of the similar faces (which would be the number of actual persons in the physical space, theoretically), $$g = T(f), \text{ where } f \in F = \{f_1, f_2, \ldots, f_N\} \text{ and } g \in G = \{g_1, g_2, \ldots, g_M\}.$$

Figure 11:
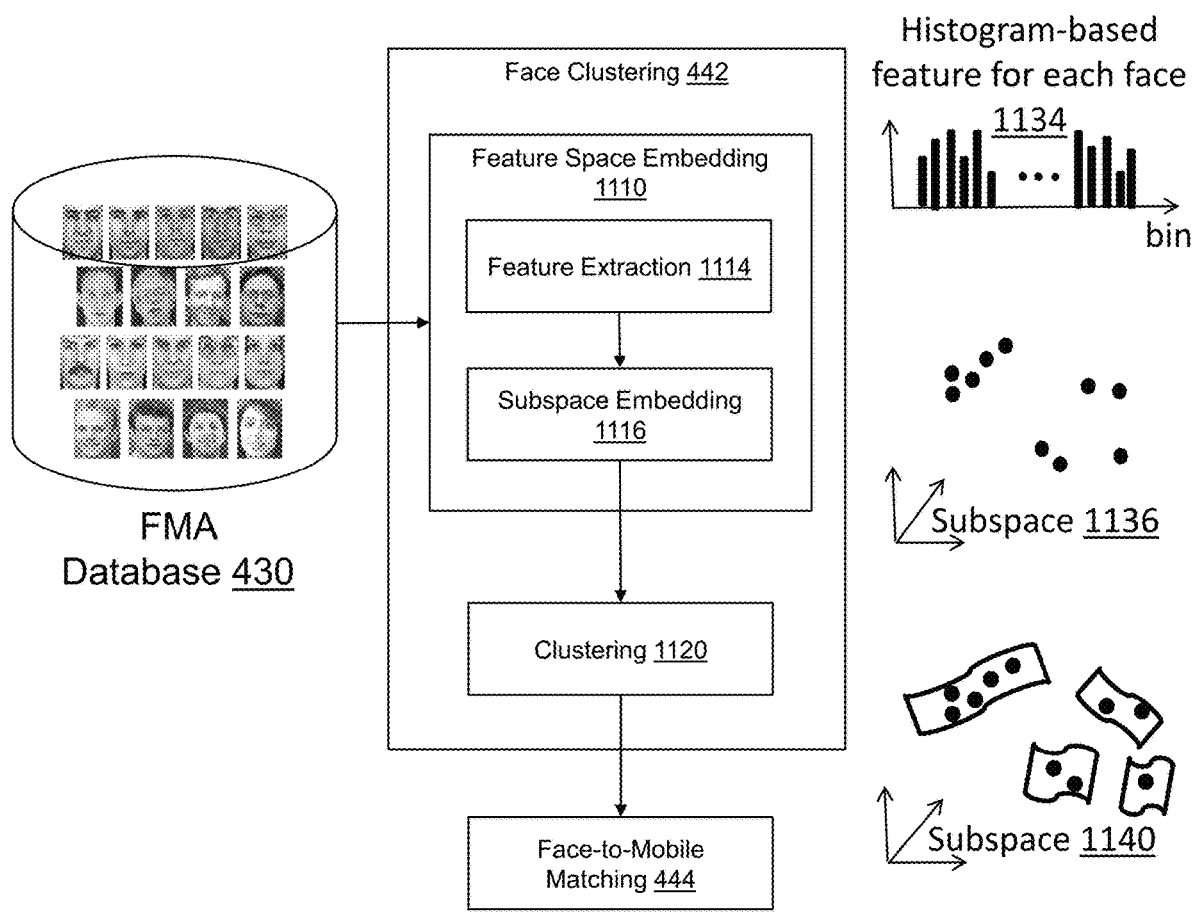
FIG. 11 shows a detailed block flow diagram of the Face Clustering module with example output from exemplary modules.

In an embodiment, face clustering 442 can further comprise two steps: feature space embedding 1110 and clustering 1120 in the feature space, as shown in FIG. 11.

$$g = T(H(f)), \text{ where } f \in F = \{f_1, f_2, \ldots, f_N\} \text{ and } g \in G = \{g_1, g_2, \ldots, g_M\},$$

where H(•) refers to a feature space embedding operator which maps the faces into the feature space.

Feature Space Embedding 1110 can consist of Feature Extraction 1114 and Subspace Embedding 1116. The Subspace Embedding 1116 can be a mapping from an original feature space to a lower dimensional subspace with an orthonormal coordinate system. Accordingly, the feature space can be defined by this subspace.

For the Feature Extraction 1114, each candidate face can be initially represented by some features such as (but not limited to) pixel intensity, LBP (Local Binary Pattern), HOG (Histogram of Oriented Gradient), and BIF (Biologically Inspired Feature), an example output of which is illustrated in 1134. All representations can be based on the local or global characteristics in the candidate face images. Then, a feature or a mixture of features can be used as the input to the Subspace Embedding module 1116 or the Clustering module 1120 directly.

When the mixture of features is used, Subspace Embedding 1116 can alleviate the redundancy by finding characterized orthogonal coordinates like PCA (Principal Component Analysis), LLE (Local Linear Embedding), and ISOMAP (ISOmetric Mapping). In this case, the Subspace Embedding 1116 can improve the discrimination between different persons' faces. An example output illustration of the Subspace Embedding 1116 is shown in 1136.

Given the feature space, the face clustering 1120 can be based on an appropriate similarity measure and a specific clustering method. An example output illustration of clustering 1120 is shown in 1140.

In an embodiment, PCA-based subspace embedding can produce the feature space in a Euclidean space so that a geometric distance like the Euclidean distance in the feature space can be used as a similarity measure. The more similar the two candidate face images are, the smaller their geometric distance in the feature space becomes. After performing the subspace embedding to all candidate face images, a Hierarchical Clustering Analysis or an Iterative K-Mean clustering can be applied as a face clustering method. In the meanwhile, the number of clusters may be determined by a given similarity threshold.

In another embodiment, the face images can be clustered on a manifold based on the fact that the same person's faces with varying parameters (such as facial pose, illumination, etc.) reside on a manifold in an embedded feature subspace like ISOMAP. In this case, the similarity measure can be determined by a geodesic distance metric on the manifold. Given the feature space and the similarity measure, the face clustering can be carried out by a clustering method including, but not limited to, a Hierarchical Clustering Analysis and an Iterative K-mean clustering. Here, the number of clusters can be determined by a given similarity threshold.

Next, the probability $P(g_i|x)$ that a group of faces, $g_i$ corresponds to the MAC address x, where $1 \leq i \leq M$, can be computed using the Face-to-Mobile Matching Probability Computation 810 module. An example output of this process is illustrated in 1204 of FIG. 12.

An embodiment on how to compute such probability may be based on how frequently a same face visits a physical space at the times when the MAC address x is detected within the physical space, which can be described as the relative rate of visits by a face compared to the visits by a MAC address.

To formulate the problem more concretely, $V(g_i)$ can be defined as the number of visits by the face group $g_i$ and N, as above, can be the number of visits by the MAC address x.

Then the relative visit rate of a face group $g_i$ with regard to x, $r_{x,i}$, can be found by $$r_{x,i} = \frac{V(g_i)}{N}.$$

Figure 12:
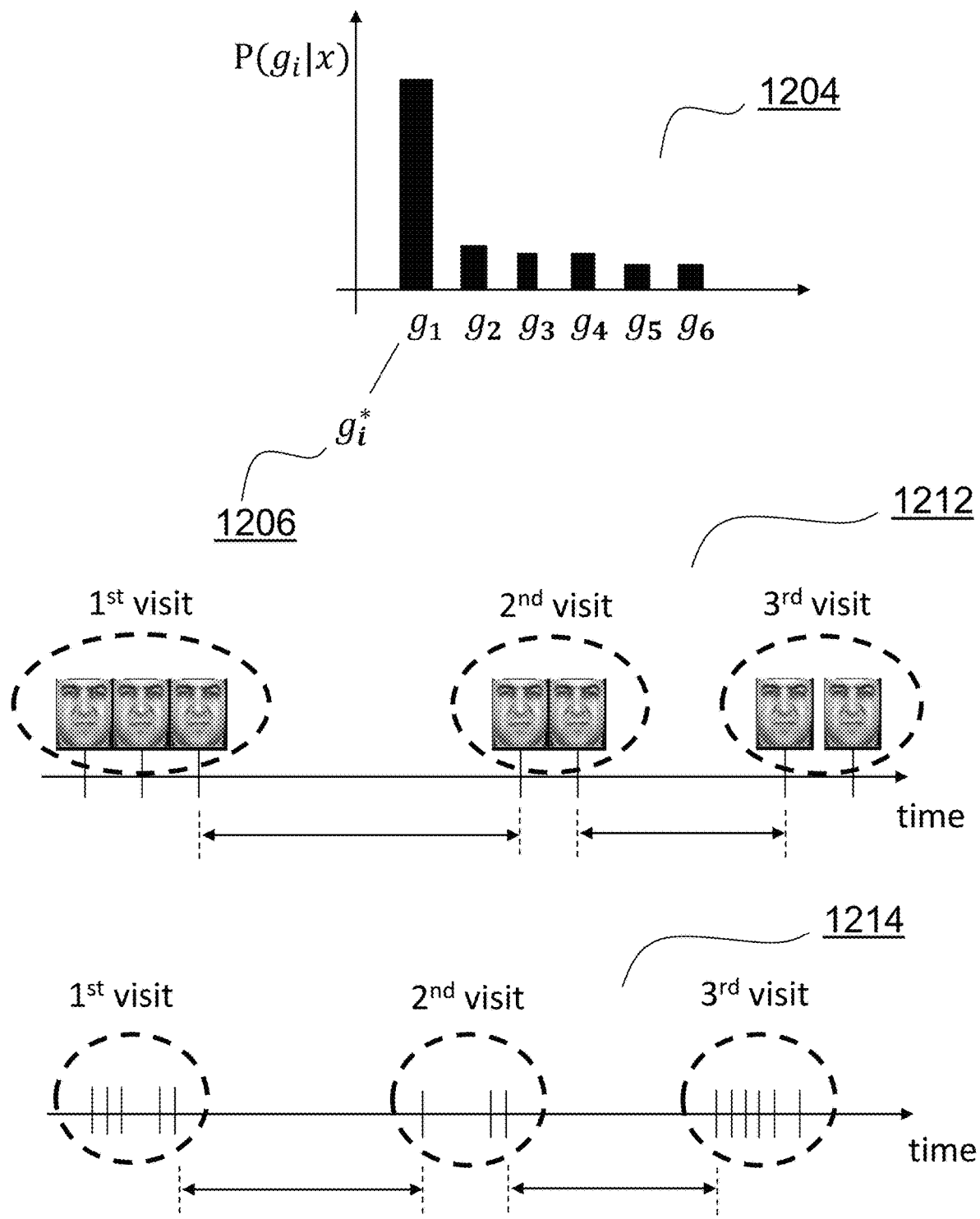
FIG. 12 illustrates steps used to calculate face-to-mobile matching probability.

FIG. 12, 1212, illustrates how $V(g_i)$ can be computed by: (1) further grouping the faces in the face group $g_i$ based on the capture time in such a way that the faces captured consecutively within a time bound (e.g., 1 hour) are grouped together, assuming that they are captured in a single visit, and (2) then counting the number of such groups, assuming each group of faces represents a single visit.

N can also be computed similarly with respect to the detection time of the MAC address, as shown in 1214.

Note that determining whether two consecutive appearances of a face belong to the same visit or not (1) may be based solely on a time difference of the two appearances or (2) may also be based on the location of the faces captured in the case where the captured face locations are available in the form of, for example, their world coordinates or just the location of the cameras that captured the faces. Therefore, if the faces are captured in two different locations that are distant enough to each other, they may be defined as two different visit although they may be captured not too distant in time.

One example case for this would be, for example, a large mall where there are two doors in an opposite side and a shopper enters from a door and exits though the other door. In this case, the shopper's face may be considered to appear in two different physical locations (i.e., two different visits) although the shopper may spend only few minutes within the mall.

The aforementioned way of defining a visit can also apply to the mobile device when at least a rough location of the mobile devices are available by means of a mobile device tracker or a proximity sensor.

Using the Face-to-Mobile Matching Probability Computation 810 module, $r_{x,i}$ can be converted into a probability measure $r'_{x,i}$ through a normalization process:

$$r'_{x,i} = \frac{r_{x,i}}{\sum_{i=1}^{M} r_{x,i}}$$

$P(g_i|x)$ can then be computed as $r'_{x,i}$ in an embodiment.

Given the probability measure $r'_{x,i}$, now, using the Best Matching Discovery 820 module, the face group $g_i^*$ 1206 can be found that maximizes the probability $P(g_i|x)$ subject to the probability being no less than a threshold $P_{min}$, as illustrated in 830.

The maximum probability can be defined as $$l_x = \max_{1 \leq i \leq M} P(g_i \mid x).$$

Then, the face group $g_i^*$ 1206 can be found by $$i^* = \underset{1 \leq i \leq M}{\mathrm{argmax}} P(g_i \mid x), \text{ subject to } l_x \geq P_{min}.$$

In an embodiment, this can then be computed first by defining the max probability as $$o_x = \max_{1 \leq i \leq M} r'_{x,i},$$

and then by finding $$i^* = \underset{1 \leq i \leq M}{\mathrm{argmax}} r'_{x,i}, \text{ subject to } o_x \geq P_{min}.$$

It can be undesirable to find such face group when the total number of visits of a MAC address is too small. Therefore, the minimum number of visits by the MAC address $N_{min}$ can be added as an additional constraint, as illustrated in 840:

$$i^* = \underset{1 \leq i \leq M}{\mathrm{argmax}} P(g_i \mid x), \text{ subject to } l_x \geq P_{min} \text{ and } N > N_{min},$$

which can be computed in an embodiment as $$i^* = \underset{1 \leq i \leq M}{\mathrm{argmax}} r'_{x,i}, \text{ subject to } o_x \geq P_{min} \text{ and } N > N_{min}.$$

Also, it may be undesirable to associate a MAC address to a face group when there's another compelling face group whose probability is too close to the $l_x$. Therefore, in an embodiment, another constraint may be added:

The second-most maximum probability can be defined as $l'_x$. Then the difference between the first and second maximum probability should be larger than a threshold $L_{min}$, as illustrated in 850:

$$i^* = \underset{1 \leq i \leq M}{\mathrm{argmax}} P(g_i \mid x), \text{ subject to } l_x \geq P_{min}, N > N_{min}, \text{ and } |l_x - l'_x| > L_{min}.$$

Once i* is found, the group of faces found $g_i^*$ 906 can then be associated with the MAC address x.

Figure 13:
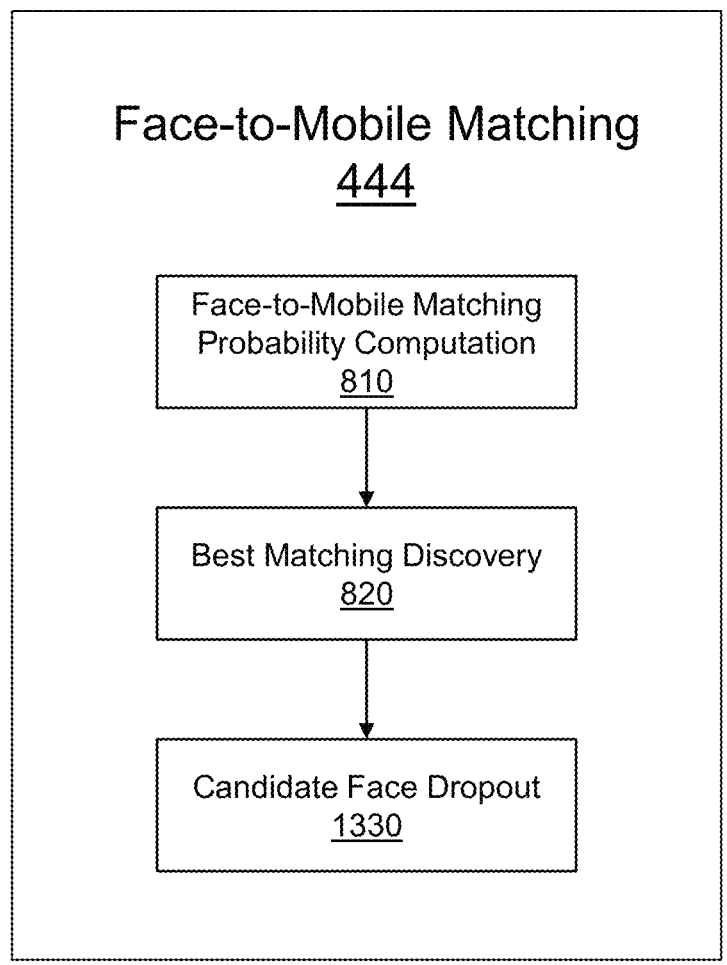
FIG. 13 shows a detailed block flow diagram of an embodiment of the Face-to-Mobile Matching module.

Note that the data association process, as illustrated in FIG. 8, can be performed iteratively whenever a new visit of the MAC address x is detected and its candidate face images are newly acquired accordingly. In an embodiment that is shown in FIG. 13, at each iteration, a candidate face group $g_i$ whose $P(g_i|x)$ is less than the threshold $P_{min}$ may be dropped from consideration as shown in the Candidate Face Dropout module 1330. Dropping low-probability groups can result in the candidate face group G not ever-growing (that is, M is not ever-increasing), helping to reduce computation time of the process.

Detailed Example and Applications

There can be many applications for the exemplary embodiments presented. One possible application can be for the association of a shopper's face with the MAC address of that shopper's mobile device as the shopper makes multiple visits to a physical space in a retail location over time. It can be noted that in addition to visiting the same physical space over time, the shopper could be detected visiting a different physical space in the same retail location. Further, the shopper could be detected in different physical spaces in different retail locations. As long as the shopper's face and the MAC address of the shopper's mobile device can be detected on multiple occasions over time, the association process can occur.

Figure 14:
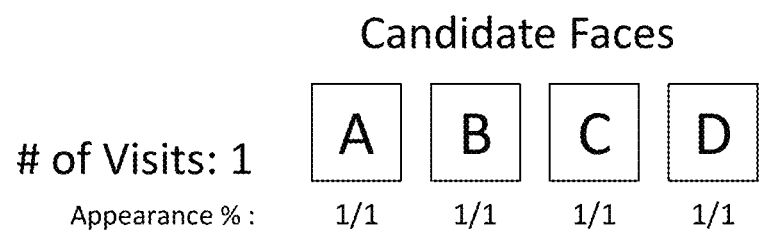
FIG. 14-19 illustrate a detailed example of an exemplary embodiment of the data association process.

FIG. 14 shows the first step of a detailed example of an exemplary embodiment. A set of candidate faces can be captured for the first visit of a shopper carrying a mobile device possessing a MAC address as a unique identifier. In this example, four candidate faces, A, B, C, and D, were detected within a range of time that the shopper's mobile device was detected by an AP as being present in the physical space. It can be assumed that the Candidate Faces identified have already been clustered into groups consisting of the same shopper. Since this can be the first time that the mobile device containing that particular MAC address was detected, the "# of Visits" indicator can be set to 1. Further, there is an indication of how many times that each of the Candidate Faces has been detected for each detection of the particular MAC address, labeled the "Appearance %." In this case, since it is the first appearance of the MAC address, each face has a 1/1 appearance percentage. As the minimum number of visits by the MAC address is set to 5 in this example, the process will continue until the "# of Visits" indicator reaches 5 visits.

Figure 15:
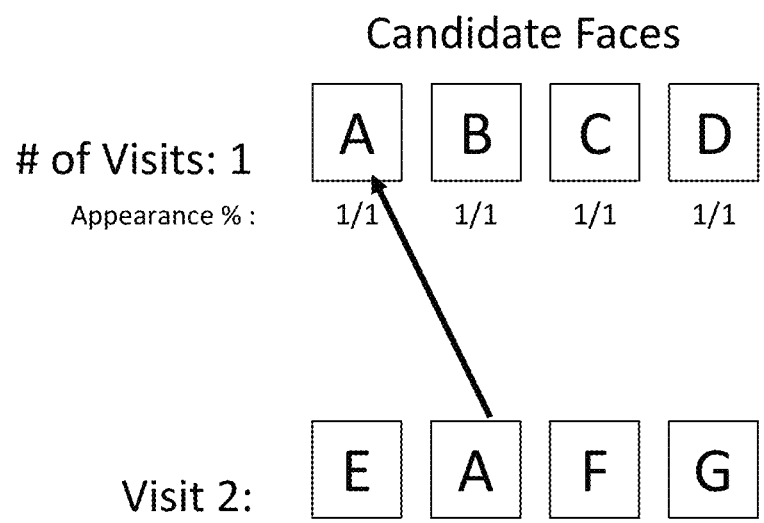

FIG. 15 shows the second visit of the MAC address. The Candidate Faces detected for Visit 2 are E, A, F, and G. A face verification test can show that face A is a repeat visitor. The "# of Visits" and "Appearance %" indicators can then be updated during the next iteration.

Figure 16:
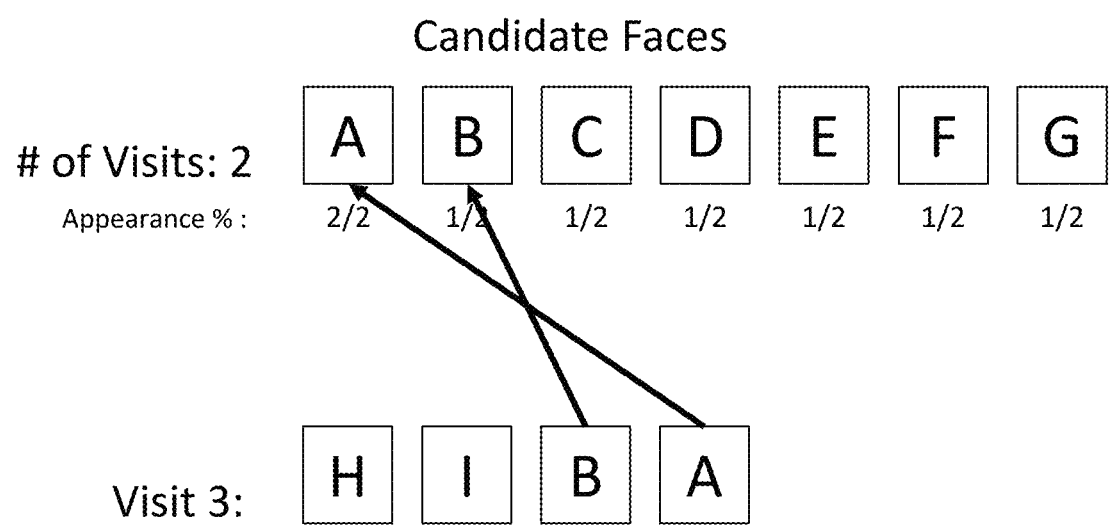

FIG. 16 shows the third visit of the MAC address and the intermediate results of the collected candidate face images until the second visit of the MAC address. In this case, faces H, I, B, and A are detected. It can also be seen that the "# of Visits" indicator (which shows the results until the latest measurements) has been updated to 2 and the "Appearance %" indicator has been updated to show that face A has appeared in 2 out of 2 visits by the MAC address, while faces B, C, D, E, F, and G have appeared in 1 out of 2 visits.

Figure 17:
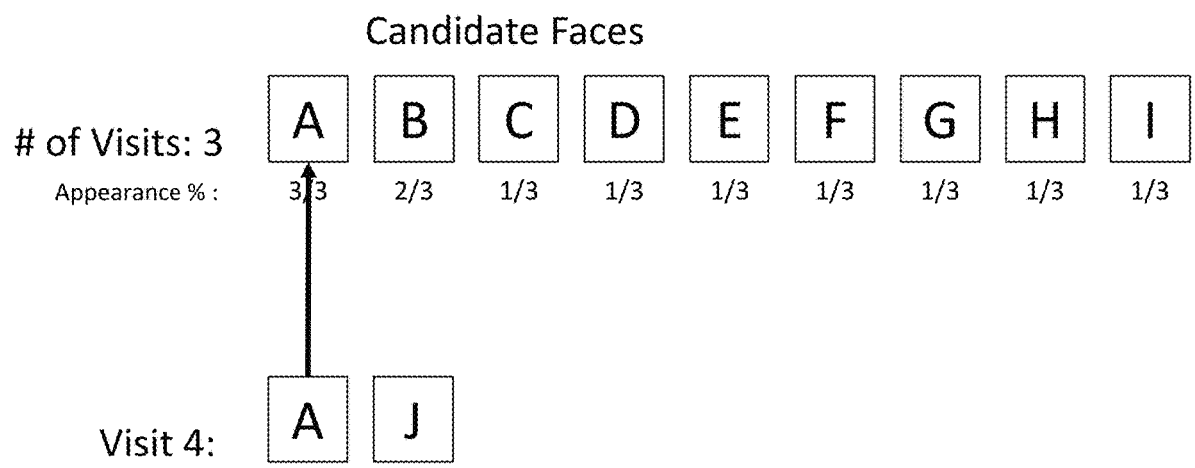

FIG. 17 shows the fourth visit of the MAC address and the intermediate results of the collected candidate face images until the third visit of the MAC address. In this instance, faces A and J are detected, with A being a repeat visitor. It can also be seen that the "# of Visits" indicator has been updated to 3 and the "Appearance %" indicator has been updated to show that face A has appeared in 3 of 3 visits, face B has appeared in 2 of 3 visits, and faces C, D, E, F, G, H, and I have appeared in 1 of 3 visits.

Figure 18:
Figure 18:
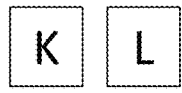

FIG. 18 shows the fifth visit of the MAC address. In this case, there were no repeat faces detected, as it was the first detection of faces K and L. This illustrates the possibility that a face may be misidentified, a mobile device may be carried by a different individual (such as a friend or family member of the shopper who carried the device in previous visits), or that even if the same shopper carries the mobile device, there may be times that the shopper's face is not detected. There are a number of reasons why a shopper may not be detected. For example, the shopper may have changed their look, modified facial hair or makeup, or was wearing some concealing clothing such as a hat. It is also possible that the person was misidentified by the system. It can also be seen that the "# of Visits" indicator has been updated to 4 and the "Appearance %" indicator has been updated to show that face A has appeared in 4 of 4 visits, face B has appeared in 2 of 4 visits, and faces C, D, E, F, G, H, I, and J have appeared in 1 of 4 visits.

Figure 19:
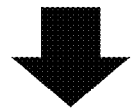

FIG. 19 shows the "# of Visits" indicator updated to show 5. It can be seen that the "Appearance %" indicator has been updated to show that face A has appeared in 4 of 5 visits, face B has appeared in 2 of 5 visits, and faces C, D, E, F, G, H, I, J, K, and L have appeared in 1 of 5 visits. Since at this point the minimum number of visits of the MAC address have been detected, the relative probabilities of each of the Candidate Faces can be evaluated. In this step, the normalized probability is then 1/4 for face A, 1/8 for face B, and 1/16 for face C-L.

Further, if the minimum acceptable probability, $P_{min}$, is 1/8, then Candidate Faces A and B pass the threshold while the rest is dropped out. It can then be seen that the maximum calculated probability is 1/4 for face A. Also, if the difference in probability from the first-to-second most probable Candidate Faces, $L_{min}$, is set to 1/8, Candidate Face A can be selected as the match, since there is 1/8 difference in probability between A and B.

While one particular application was presented in this example, there are many other possible applications for the embodiments presented. For instance, matching faces with the MAC address of a mobile device could be extremely useful for security personnel at a facility, such as a sporting venue, airport, retail location, restaurant, amusement park, or any other publicly-accessible location. Security personnel may be interested in recognizing, identifying, and tracking individuals who return to a location over time.

Face-to-PoS Association

The following sections can provide more details of an embodiment of the Face-to-PoS Association 330 module.

Event Time Series Generation

As illustrated in FIG. 5, the Event Time Series Generation 510 module can produce two separate ETSes, one based on the events from a PoS System, and the other from the events by vision-based checkout event detection.

The PoS System Event 512 module can obtain data containing Point-of-Sale (PoS) information for each checkout lane from a retail location. This PoS information can include a list of items purchased, the cost of the items, and total amount paid, after any price reductions were applied. It can also include a timestamp indicating the time that the transaction occurred. In an embodiment, it can be assumed that all checkouts at a retail location are synchronized to the same clock. In another embodiment, the timestamp from multiple checkouts must be synchronized. The collected PoS data from each transaction can form one ETS, $P=\{p_j\}$, for $j=1, \ldots, M$ PoS transactions, and can then be stored in the Event Database 520.

Figure 20:
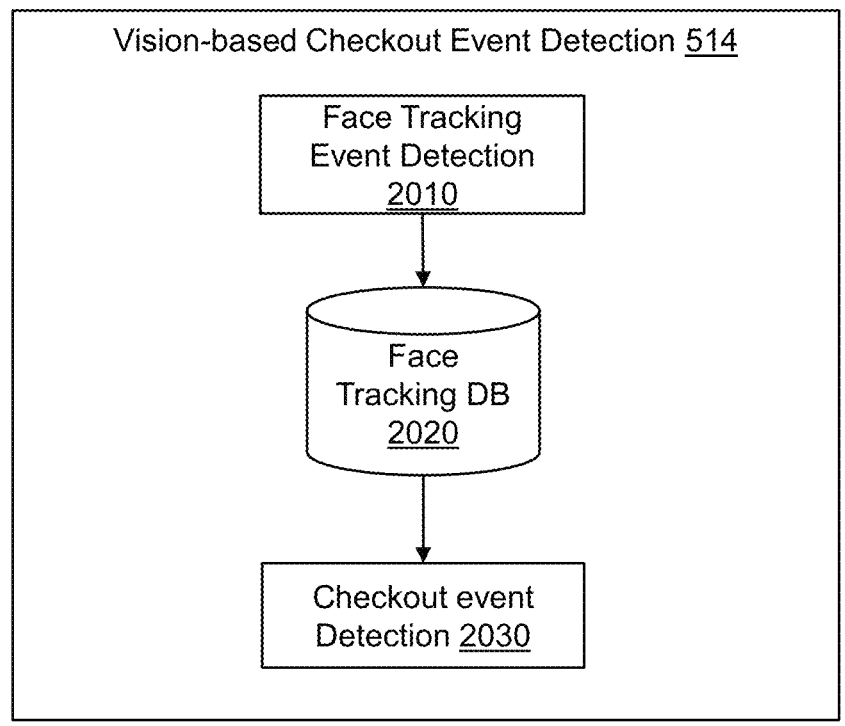
FIG. 20 shows an example block flow diagram of an embodiment of the Vision-based Checkout Event Detection module.

The Vision-based Checkout Event Detection 514 module can be used to detect when a shopper completes a transaction at a checkout area of a retail location. FIG. 20 shows a more detailed view of an embodiment of the Vision-based Checkout Event Detection 514 process. In the embodiment, a Face Tracking Event Detection 2010 module can utilize a video stream from an installed camera near the checkout area to detect and track faces of people present in the checkout area. Data containing the tracked faces can be stored in the Face Tracking DB 2020. Data from the Face Tracking DB 2020 can be used to detect checkout events (i.e., when a purchase transaction occurs at the checkout) using the Checkout Event Detection 2030 module (described below).

Figure 21:
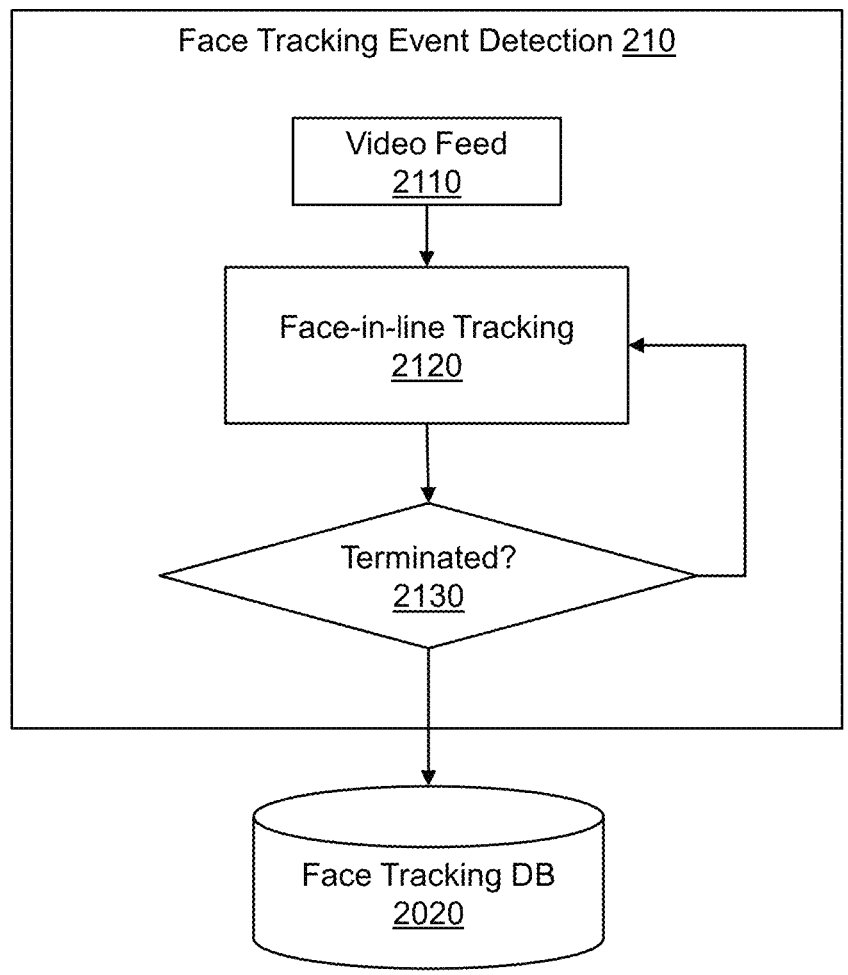
FIG. 21 shows an example block flow diagram of an embodiment of the Face Tracking Event Detection module.

FIG. 21 shows more details of an embodiment of the Face Tracking Event Detection 2010 module. A Video Feed 2110 containing an image stream showing persons while they are in the queue line near the checkout area can be received by the Face-in-line Tracking 2120 module. In the embodiment, N can be the total number of persons tracked in the Video Feed 2110. A face tracking event can be the tracking of a face (of one of the N persons tracked) that is captured in the image stream.

For N face tracking events, each face tracking event can be given as $f_i$ for $i=1, \ldots, N$. Each face tracking event $f_i$ can be a 4-tuple, such as $$f_i = <T_i, X_i, Y_i, S_i>,$$

where $T_i=\{t_{ik}\}$ for $k=1, \ldots, K_i$, can be the timestamps of tracked faces; $X_i=\{x_{ik}\}$ for $k=1, \ldots, K_i$ and $Y_i=\{y_{ik}\}$ for $k=1, \ldots, K_i$ can be the corresponding locations within each image of the tracked faces (for example, x and y coordinates in the image); Facial image data for the $i^{th}$ person can be $S_i=\{s_{i1}, s_{i2}, \ldots, s_{iK_i}\}$; and $K_i$ can be the length of the trajectory for the $i^{th}$ person.

In addition to the 4-tuple for each face tracking event $f_i$, for each tracked face, a unique person ID can be created.

The Face-in-line Tracking 2120 can be Terminated 2130 when the image of the person's face is no longer captured in the video stream, i.e., the person has left the checkout area. When the face tracking event is terminated, the tracked data, consisting of the person ID and the face tracking event data (the timestamp, the trajectory (tracked image locations), and the face images) can be stored in a Face Tracking DB 2020.

Figure 22:
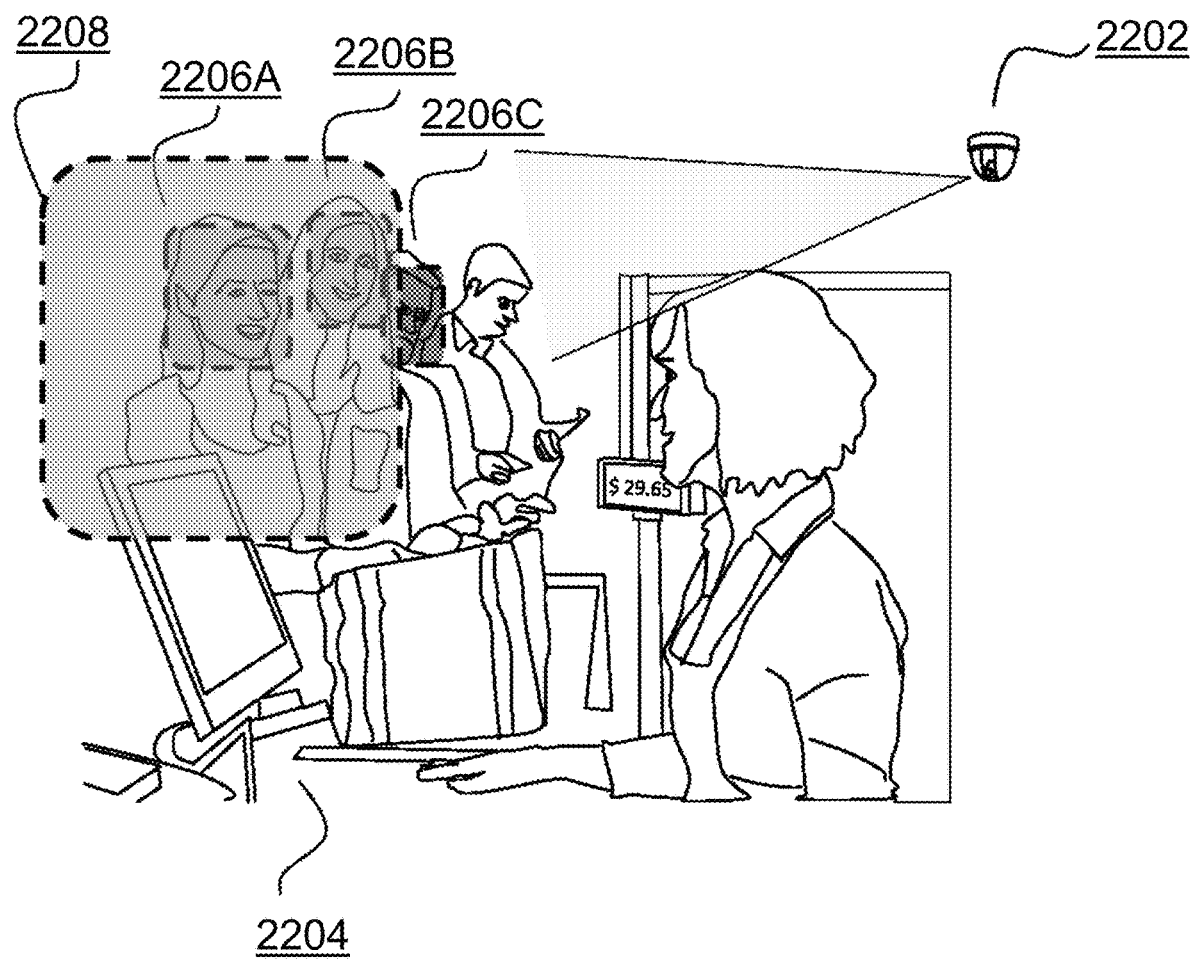
FIG. 22 shows an example embodiment of a video camera installed near a checkout area.

FIG. 22 shows an example embodiment of a video camera 2202 installed near a checkout area 2204. Persons whose faces can be tracked in the queue for checkout are shown in 2206A-C. The checkout area can be designated as a region of interest within the field of view of the face images of the video stream near the checkout (i.e., where the transaction occurs). An example of the checkout area region of interest is illustrated in 2208.

Figure 23:
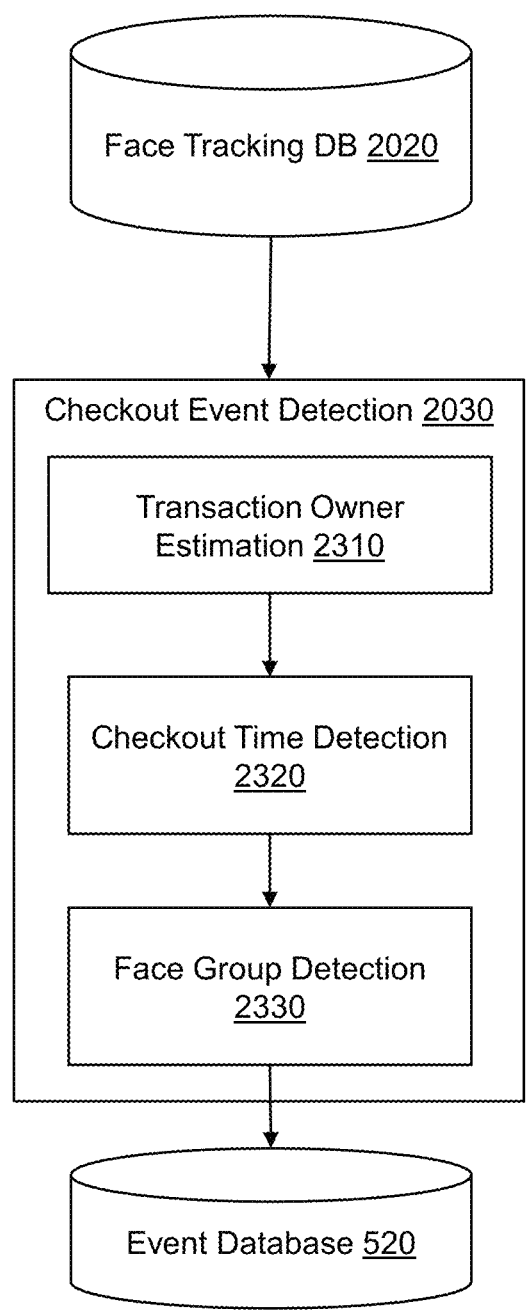
FIG. 23 shows more detail of an embodiment of the Checkout Event Detection module.

FIG. 23 shows more details of an embodiment of the Checkout Event Detection 2030 module. The face tracking events for each tracked person, $$f_i = <T_i, X_i, S_i> \text{ for } i=1, \ldots, N,$$

can be obtained from the Face Tracking DB 2020.

First, the Transaction Owner Estimation 2310 module can determine the transaction owner for each checkout event. The transaction owner can be the person most likely to have completed the transaction in the checkout area, such as illustrated in the example 2208 in FIG. 22. Then, the checkout time for the transaction can be determined using the Checkout Time Detection 2320 module. The Face Group Detection 2330 module can then determine groups of faces that can be associated with the transaction owner. The checkout event data can then be stored in the Event Database 520.

Figure 24:
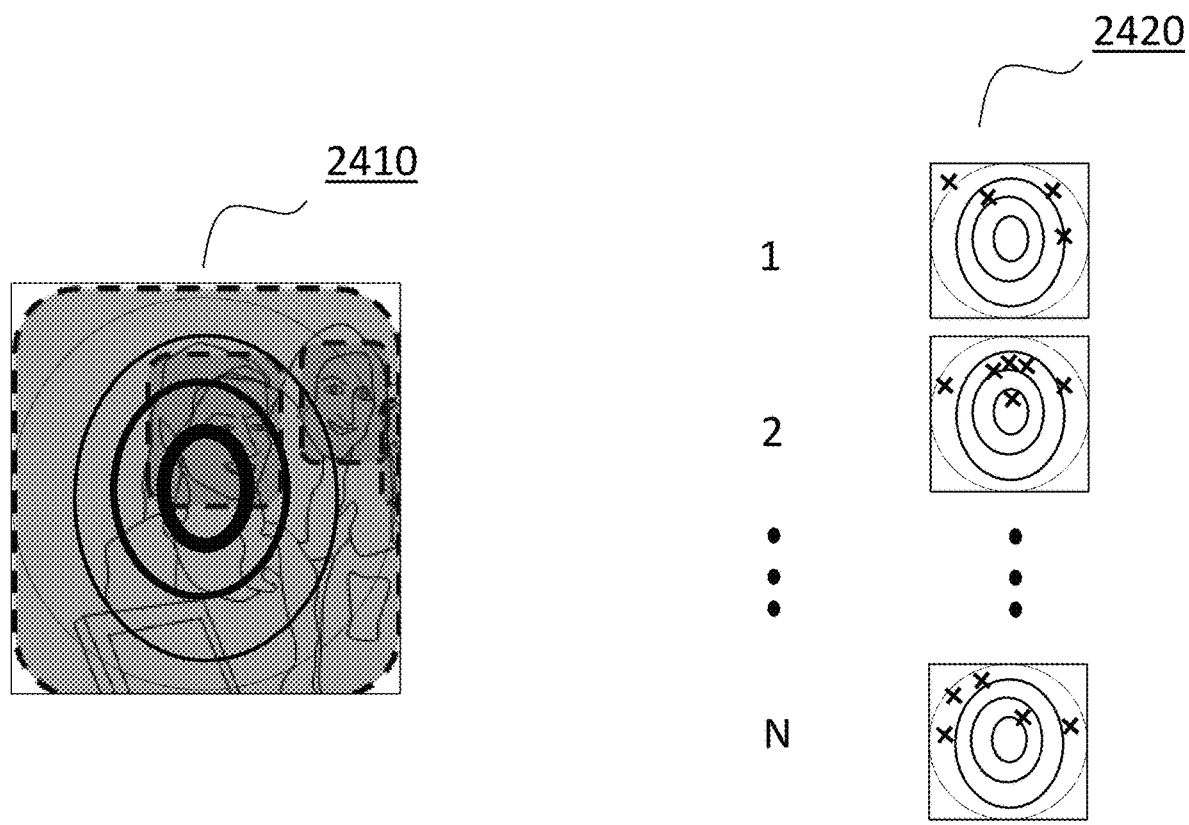
FIG. 24 shows an example of the Region of Interest within the image that the Transaction Owner Estimation module can use to provide the likelihood that a particular candidate is the transaction owner.

FIG. 24 shows an example of the Region of Interest 2410 (ROI) within the image that the Transaction Owner Estimation 2310 module can use to provide the likelihood that a particular candidate is the transaction owner. The ROI 2410 can be applied as a 2D Gaussian-like weighted region. The ROI 2410 can be chosen empirically through observation of the checkout area via the installed camera. The closer a face resides to the center of the region, the higher the likelihood can be that the person is the transaction owner. The module can then generate an occupancy map 2420. For each tracked person i, for i=1, ..., N, and using the trajectory data ($X_i$, $Y_i$) the set of occupancy maps 2420 can indicate locations where the persons were tracked in the ROI 2410 (this is shown as small x's for each occupancy map in 2420). Then the likelihood L(map(i)) that each person is the transaction owner can be calculated by the weighted sum of samples in the occupancy map (a higher likelihood value can be given based on closeness to the center of the "bull's eye"). The transaction owner p* can then be estimated using the following maximum likelihood equation, $$p^* = \arg\max_i \{L(\text{map}(i))\}.$$

Figure 25:
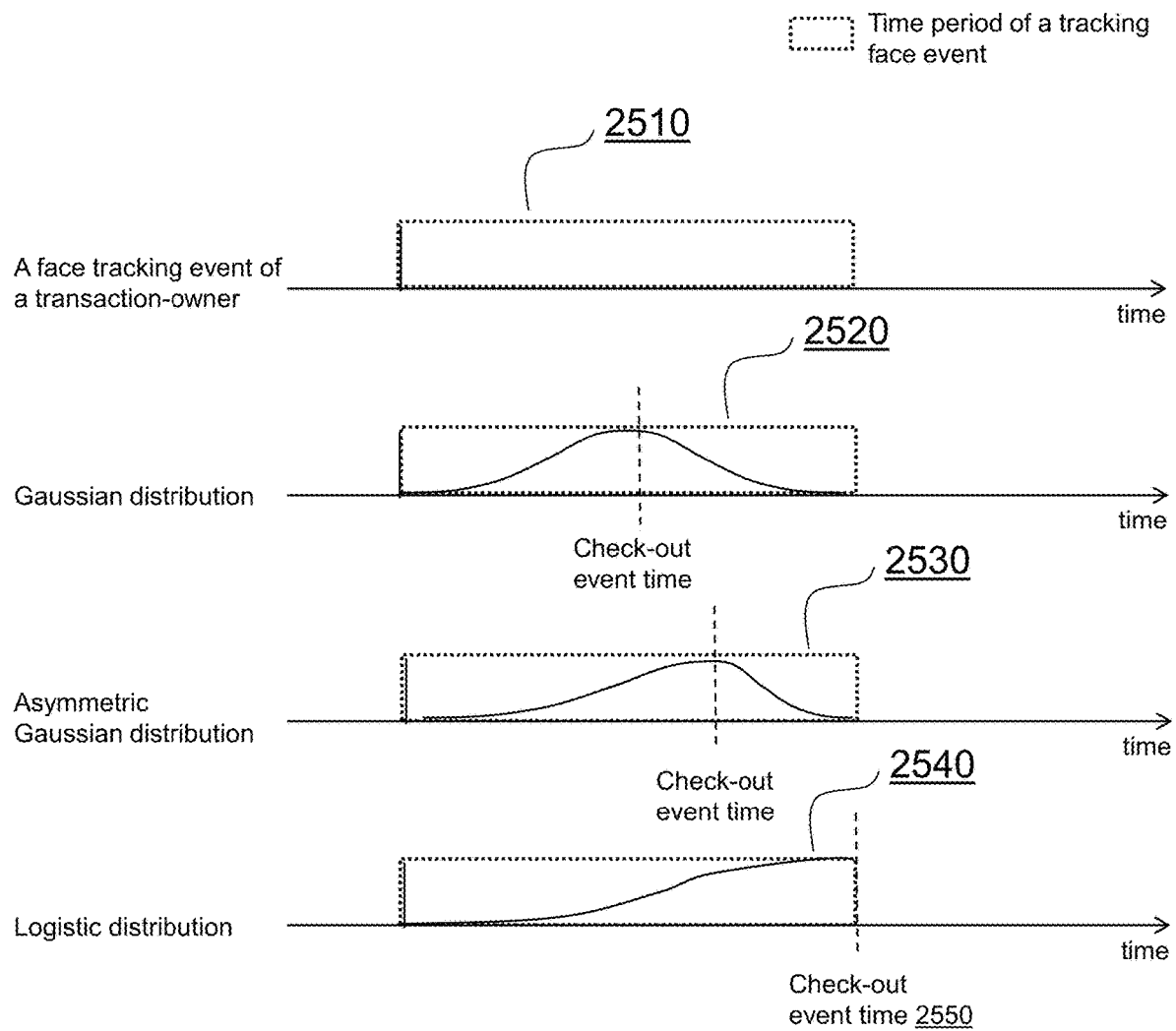
FIG. 25 illustrates an embodiment of the Checkout Time Detection module.

FIG. 25 illustrates an example of an embodiment of the Checkout Time Detection 2320 module. The time period for a face tracking event associated with a transaction owner can be determined, as shown in 2510. The possible time for a checkout event can be modeled, for example, using empirical data to establish probability based on a specific distribution, such as a Gaussian distribution 2520, an asymmetric Gaussian distribution 2530, or a logistic distribution 2540. Then, the checkout event time, $t_C$, can be determined by choosing the time with the maximum probability based on the chosen distribution. For example, when we choose the logistic distribution-based checkout event model, checkout event time 2550 is the time at the end of a face tracking event.

Figure 26:
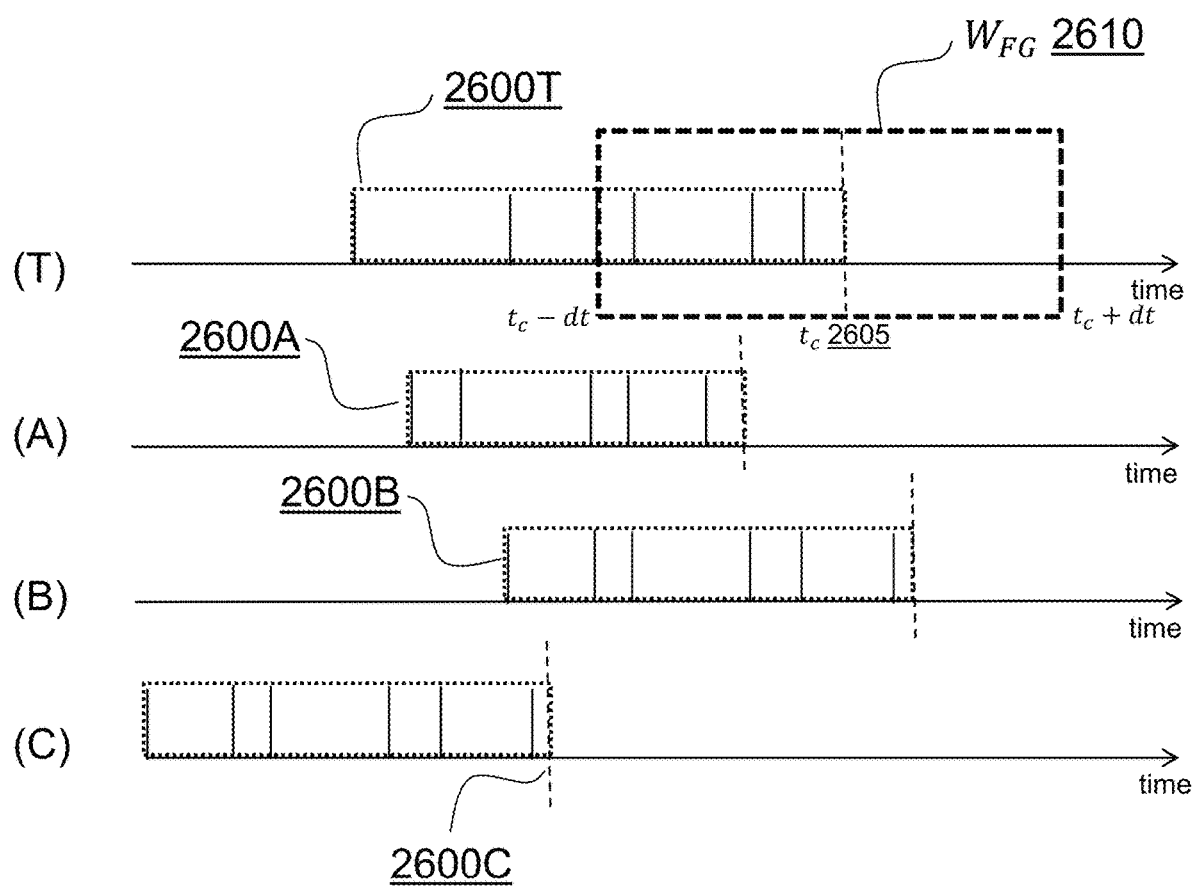
FIG. 26 illustrates an example of an embodiment of the Face Group Detection module.

FIG. 26 illustrates an example of an embodiment of the Face Group Detection 2330 module. When multiple faces are detected in the checkout area around the time of a checkout event, the Face Group Detection 2330 module can group faces that move through the checkout area at the same time. The face group can be, for example, a family (i.e., parent with children), group of friends, or other group that can be shopping in the store together. Each group can have a transaction owner who makes the actual purchase. In this example, the face tracking event for the transaction owner is shown in 2600T. The time extent of the face tracking events for persons A, B, and C are shown in 2600A, 2600B, and 2600C, respectively.

First, given the checkout event time, $t_c$ 2605, of the transaction owner (denoted as Person T in FIG. 26), the face grouping time window 2610 ($W_{FG}$) can be built with a certain time extent, dt, such as $t_c - dt < t_c < t_c + dt$. Then, a search can be done to find all face tracking events whose end time fall within the face grouping time window 2610. The face tracking events, $f_i$, that satisfy the search (persons A and B in this example, since the end times for face tracking events 2600A and 2600B fall within the time window 2610) can be aggregated as a face group, $G_S^{t_c}$, (in this example, persons T, A, and B) of the checkout event. After the face group is formed, a face tree, $Tr_C$ 2650, can be formed from the relationship of the faces to the transaction owner.

In this example, the face grouping time window 2610 is generated based on the face tracking event 2600T for transaction owner T. Face tracking events for persons A 2600A, B 2600B, and C 2600C are then shown relative to T. It can be seen that the end time for face tracking events A and B fall within the face grouping time window 2610, and so are included in the face group for event T, $G_S^{t_c}$. Since the end time for the face tracking event for person C 2600C does not fall within the face grouping time window 2610 ($W_{FG}$), it is not included in the face group for event T. The tree illustrating the face group for event T, $Tr_C$, is shown in 2650.

The ETS data generated by the Vision-based Checkout Event Detection 514 module, $$C = \{t_c, G_S^{t_c}, Tr_C\},$$

can then be passed to the Event Database 520.

Figure 27:
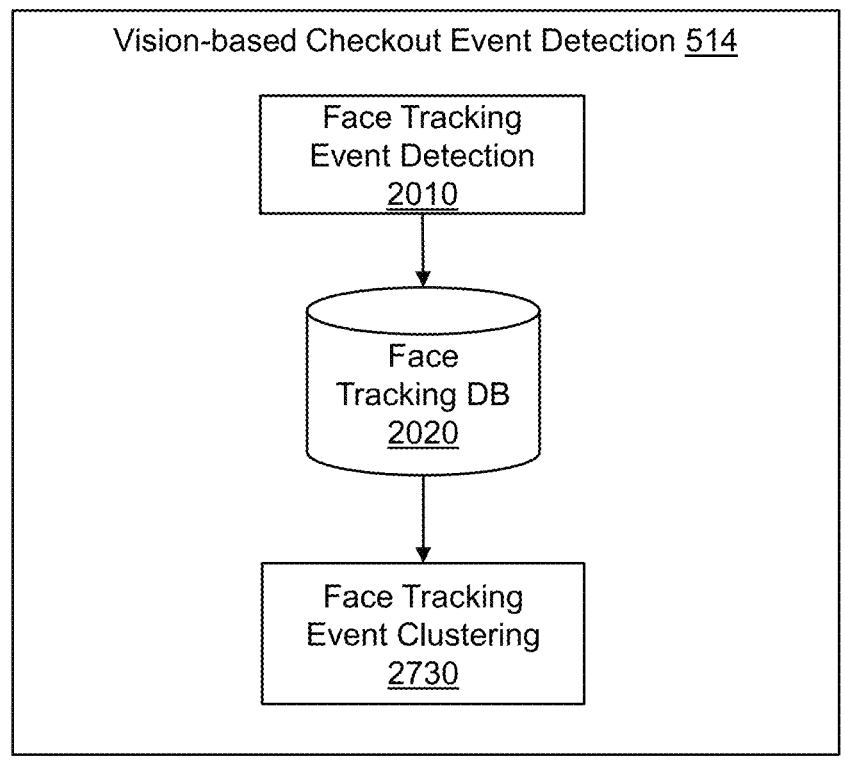
FIG. 27 shows a more detailed view of another embodiment of the Vision-based Checkout Event Detection module.

FIG. 27 shows a detailed view of another embodiment of the Vision-based Checkout Event Detection 514 module. The Face Tracking Event Detection 2010 module and Face Tracking DB 2020 can be implemented as described in the previous embodiment. For this embodiment, a list of face tracking events can be described as $F = \{f_i\}$ for i=1, ..., N where N is the total number of face tracking events. In this embodiment, groups of tracked faces of shoppers can be found using the Face Tracking Event Clustering 2730 module. The Face Tracking Event Clustering 2730 module can be used to group the events in F by first sorting, then clustering the face tracking events using the ending time stamp. The clustered face tracking events can form the set of checkout events $C = \{c_k\}$, for k=1, ..., M, where M is the number of checkout events.

Figure 28:
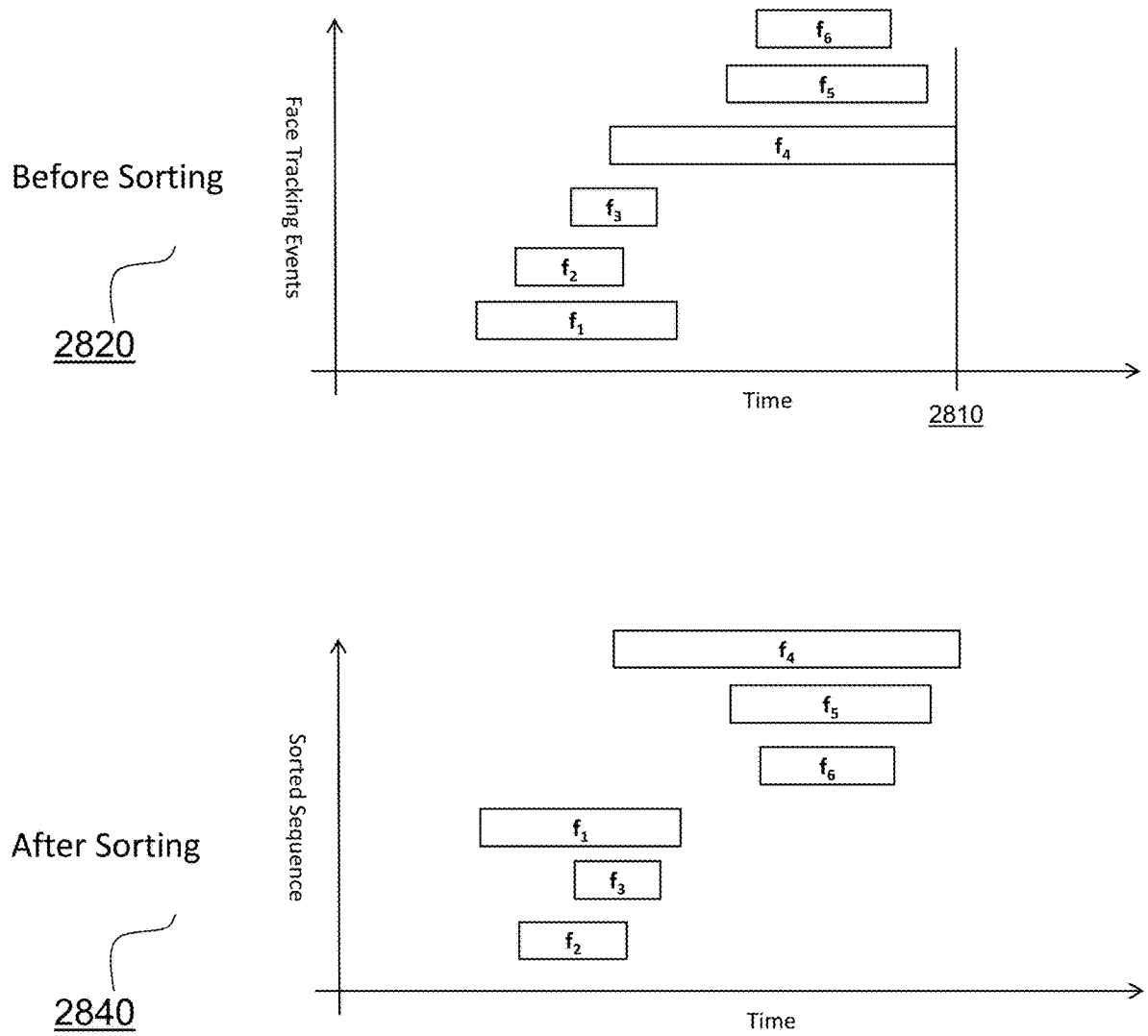
FIG. 28 illustrates an example sequence of face tracking events and the time when they occur.

FIG. 28 illustrates an example sequence of face tracking events (F) and the time when they occur. In this embodiment, $t_e(f_i)$ can be the end time stamp of an event $f_i$ in F. In the example shown in FIG. 28, the ending time stamp, $t_e$, for face tracking event $f_4$ is shown in 2810. In this case, before sorting (as shown in 2820), the face tracking events are ordered by $f_i$. Then, the face tracking events can be sorted based on the end time stamp for each event, $t_e(f_i)$, resulting in the arrangement after sorting as illustrated in 2840.

Figure 29:
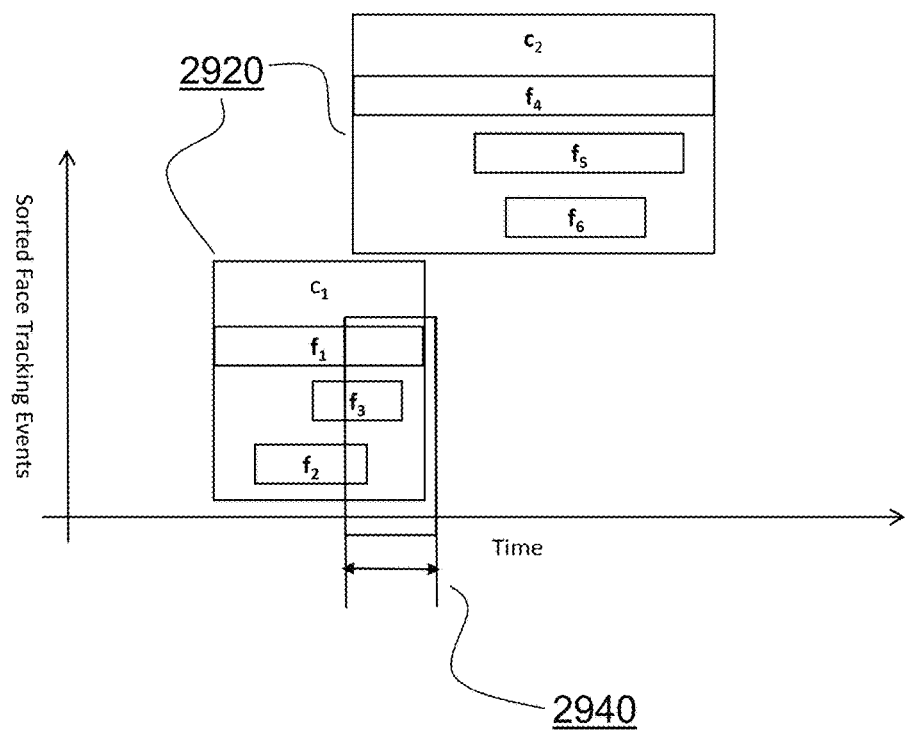
FIG. 29 shows an example of an embodiment of the clustering of the sorted face tracking events.

FIG. 29 shows an example of an embodiment of the clustering of the sorted face tracking events. In order to find the sets of clusters 2920 forming checkout events, $C = \{c_k\}$, the process can loop over each element $f_i$ of F. If the Euclidean distance between the end time stamp of $f_i$ and the center of the existing cluster, $c_k$, dist($f_i$, $c_k$), is less than a certain threshold (the cluster radius threshold, as illustrated in 2940), then $f_i$ can be put in $c_k$, and the center of $c_k$ can be updated. If not, then the cluster $c_k$ can be closed, a new cluster ($c_{(k+1)}$) can be created, and $f_i$ can be placed in $c_{(k+1)}$. The loop can continue until there are no more face tracking events F to place into a cluster.

In this embodiment, let $t_e(c_i)$ be the end time for a checkout event $c_i$ in C. Then, the checkout event time $t(c_i)$ (known as the checkout time in the previous embodiment) can be designated as a fixed offset from $t_e(c_i)$:

$$t(c_i) = t_e(c_i) - \Delta_t, \text{ where } \Delta_t \text{ is empirically chosen based on checkout observation.}$$

ETS data generated by the embodiment of the Vision-based Checkout Event Detection 514 module, comprising the set of checkout events C and associated checkout event times $t(c_i)$, can then be passed to the Event Database 520.

Event Time Series Clock Alignment

After ETS data for PoS system events and vision-based checkout events are stored in the Event Database 520, the Event Time Series Clock Alignment 530 module can begin the process of finding event correspondences by aligning the clocks of each ETS. This process can account for the assumption that the event occurrences in each ETS are in order. It can also be assumed that there is a loose clock sync between systems over time, and that the dynamic time drift can be assumed to be negligible over at least the period of interest.

Figure 30:
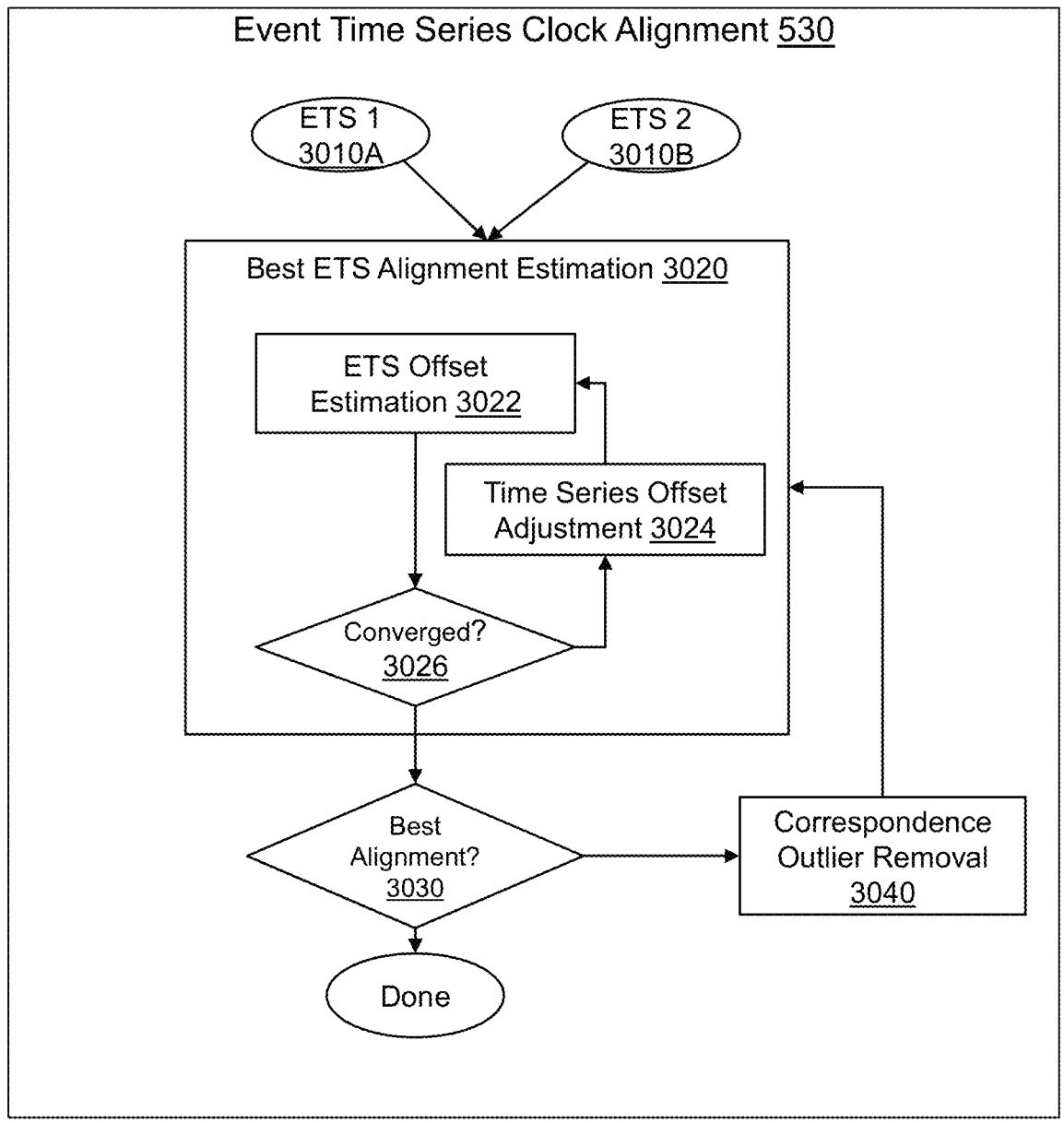
FIG. 30 shows an example block flow diagram of the Event Time Series Clock Alignment module.

In an embodiment illustrated in FIG. 30, the Event Time Series Clock Alignment 530 module can use a discrete, iterative, dynamic time warping (DTW)-like process to align the clocks for each ETS. Given two discrete ETSes, the DTW-like process can find the best time offset (i.e., best alignment, subject to a threshold) between the two ETSes without outliers.

In this embodiment, the process can begin as the two ETSes, ETS 1 3010A, a, and ETS 2 3010B, b, can be sent to the Best ETS Alignment Estimation 3020 module. The ETS Offset Estimation 3022 module can find a warping path W between each corresponding set of events in i in ETS 1 3010A and ETS 2 30106, where W(i) indicates ith correspondence pair in the warping path W wherein the ith correspondence pair consists of the index of an event in a (that can be represented as W(i).a) and the index of an event in b (that can be represented as W(i).b) and thus a(W(i).a) and b(W (i).b) indicate the event in a and b that belongs to the ith correspondence pair in the warping path W, respectively. A pair of corresponding events joined by a warping path can be called a correspondence pair.

Figure 31:
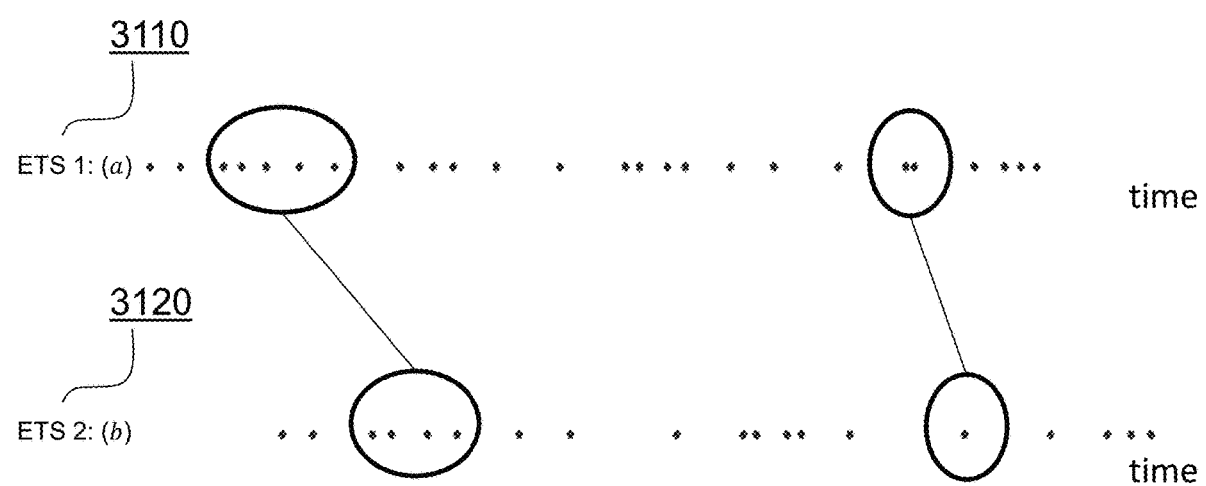
FIG. 31 illustrates an example set of two event time series.

FIG. 31 illustrates an example set of two ETSes, ETS 1 3110 and ETS 2 3120. For this example, ETS 1 3110 shows 25 events from a uniformly, randomly generated ETS in a 10-100 second interval. For this example, ETS 2 3120 is 19 events generated based on ETS 1 with a random perturbation in the time index with random removal and addition of events. It is offset from ETS 1 by 200 seconds.

Figure 32:
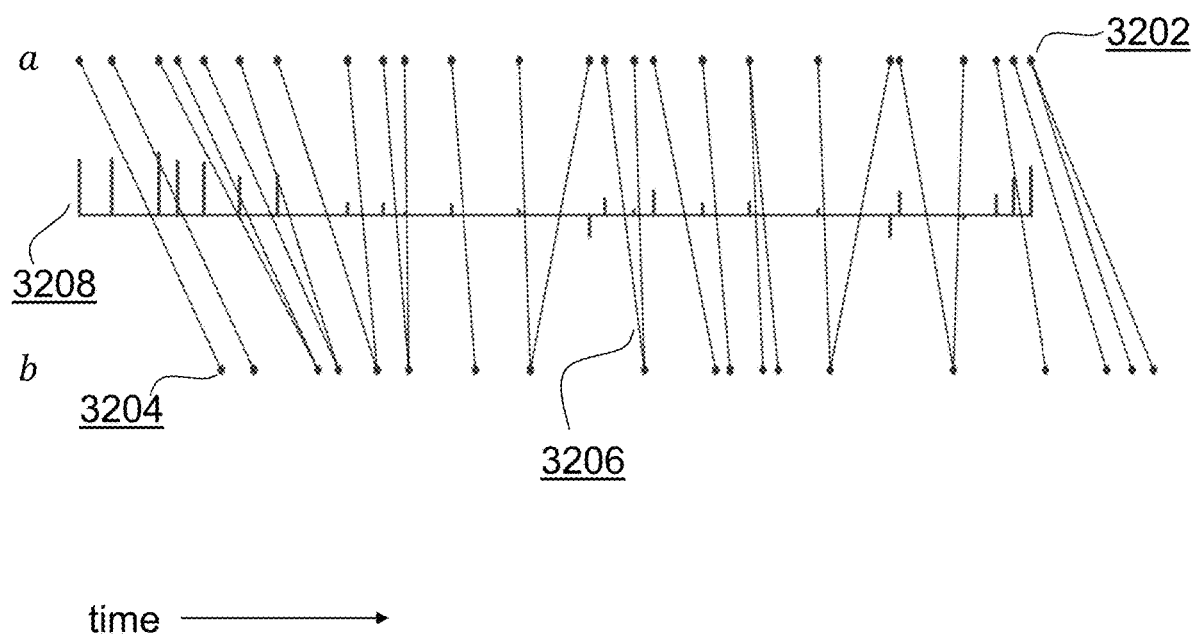
FIG. 32 illustrates the events from the two example time series along with a warping path.

FIG. 32 illustrates the events (shown as points) from the two example ETSes along with a warping path W. In this case, elements (each event) of the first ETS, ETS 1 3110 ($a$), can be represented by the top set of points 3202, and elements (each of event) of the second ETS, ETS 2 3120 ($b$), can be represented by the bottom set of points 3204. For this example, time is advancing from left to right. A set of lines 3206 connect points from the first ETS with their corresponding events in the second ETS. It can be noted that multiple events from the first ETS might be associated with a single event in the second ETS. Likewise, a single event in the first ETS might be associated with multiple events in the second ETS. The set of lines 3206 comprise the warping path W.

The module can then compute a distance metric, tdiff(a (W(i).a),b(W(i).b)), representing the time index disparity between the corresponding events. The average and standard deviation of the time index disparity for all events in i can be calculated. An example of the time index disparity between corresponding events can be illustrated graphically by the bars shown along the axis in 3208.

For each iteration of the Best ETS Alignment Estimation 3020 process, the change in standard deviation of the time index disparity between a and b from the previous iteration can then be tested to see if it is less than a predetermined threshold (shown in the convergence check 3026 step). If not (or, automatically for the first iteration), the Time Series Offset Adjustment 3024 module can adjust the time index of b, by subtracting the average time difference. The process can then resume another iteration starting with the ETS Offset Estimation 3022 module. If the change in standard deviation of the time index disparity between a and b from the previous iteration is less than a predetermined threshold, the alignment process can be considered converged and the Best ETS Alignment Estimation 3020 module can be stopped.

The process can then test to determine whether the best alignment of the ETSes has been reached using the Best Alignment 3030 module. The Best Alignment 3030 module can perform two tests, either of which could indicate that the best alignment has been obtained. First, a comparison can be done to determine whether the standard deviation of the time difference disparity for all the events in i that are part of the found correspondences for the current iteration is greater than the standard deviation of the previous iteration. If that is true, the best alignment had been found in the previous iteration, so the Event Time Series Clock Alignment 530 process could be stopped, and the resulting data from the previous iteration passed to the next step, the Event Matching 540 module.

Also as part of the Best Alignment 3030 step, the process can test whether the remaining number of elements (after outlier removal, described below) in a and b are less than a predefined threshold (for example, a threshold could be set to be 50% of the initial number of elements). If that is true, the best alignment has been found, so the Event Time Series Clock Alignment 530 process could be stopped, and the resulting data passed to the next step, the Event Matching 540 module.

If neither test from the Best Alignment 3030 step is true, the process can continue with the Correspondence Outlier Removal 3040 module. First, the correspondence pairs can be sorted in ascending order according to the time difference between them. Then, a predefined portion (for example, in an embodiment, 10%) of the correspondence pairs with larger time differences can be removed from consideration. This can be done to ignore outliers that incur a large association cost. Next, all elements in a and b that are not referred by the remaining inlier correspondence pairs can be removed from consideration. The process then can resume with another iteration of the Best ETS Alignment Estimation 3020 process.

Figure 33:
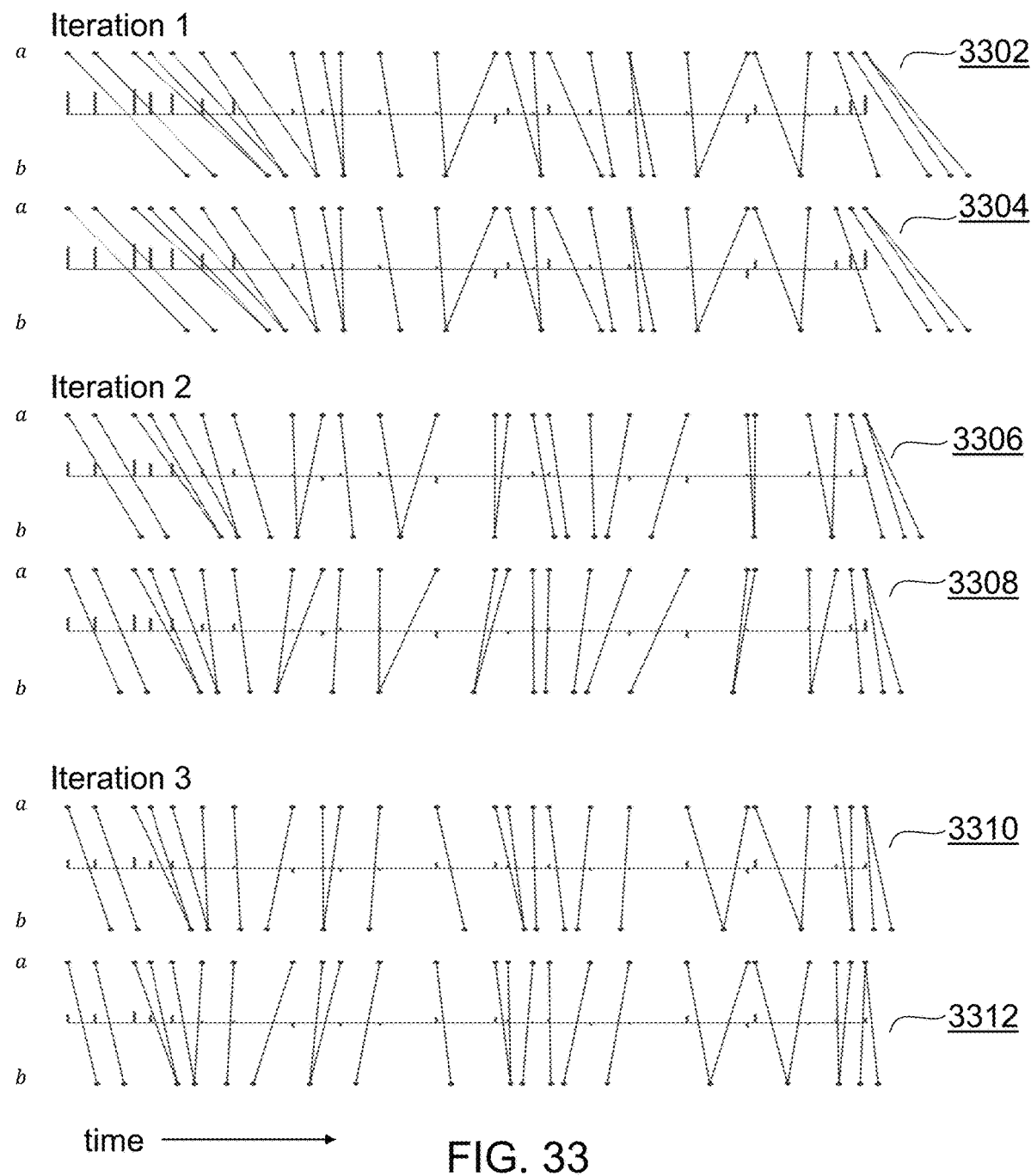
FIG. 33-35 show an example embodiment for selected iterations of an application of the discrete Event Time Series Clock Alignment module.
Figure 34:
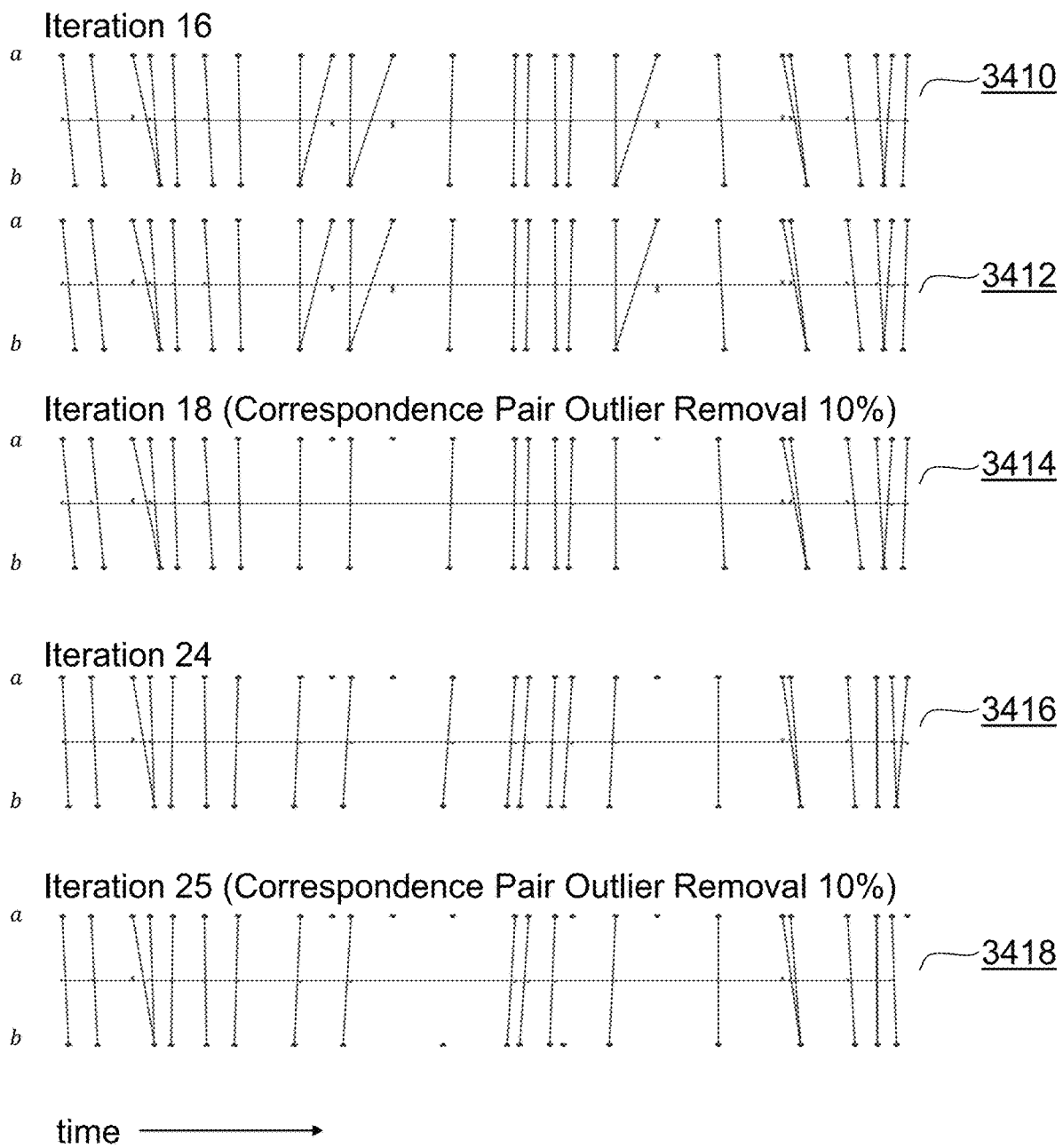
Figure 35:
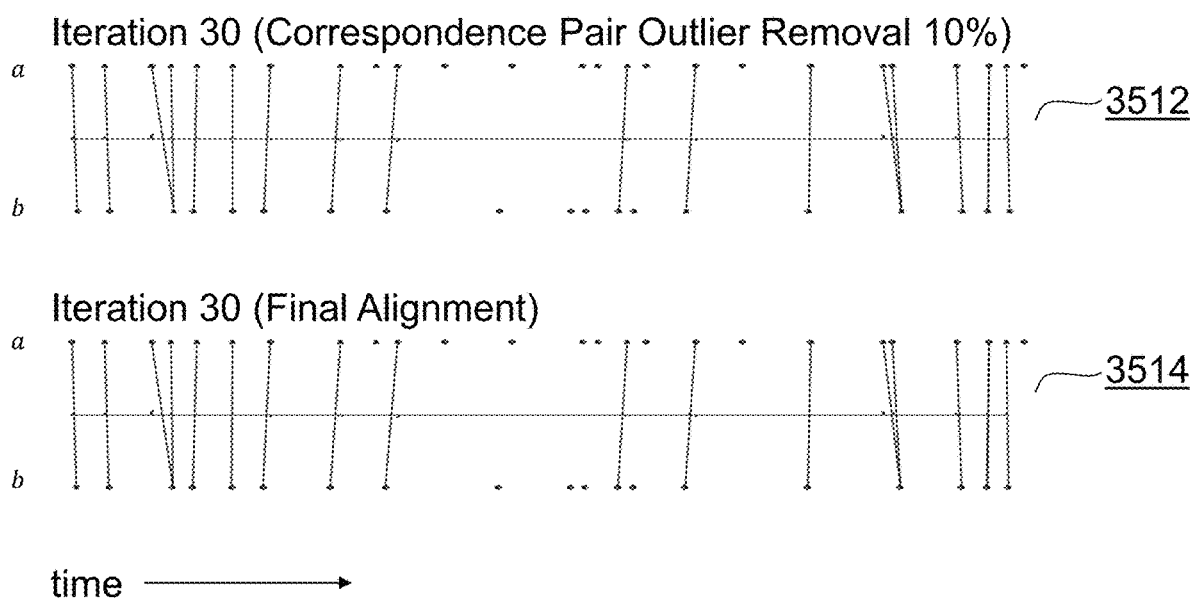

An example embodiment for selected iterations of an application of the discrete Event Time Series Clock Alignment 530 module is shown in FIG. 33, FIG. 34 and FIG. 35. The correspondence pairs for iterations 1, 2, 3, and 16 are shown in 3302, 3306, 3310, and 3410, respectively. The mapping offset for iterations 1, 2, 3, and 16 are shown in 3304, 3308, 3312, and 3412, respectively, as the time index of b (the lower ETS) is adjusted. For this example, removal of 10% of the correspondence pair outliers is shown for iteration 18 in 3414. Then, the mapping offset for iteration 24 is shown in 3416. The removal of 10% of the correspondence pair outliers is shown for iterations 25 and 30 in 3418 and 3512, respectively. Finally, the final alignment of the ETS is shown in 3514. The process was complete after 30 iterations. The final alignment resulted with an offset of ETS 2 3010B by −189.69 sec. For this example, the ground truth offset was −200 sec.

Figure 36:
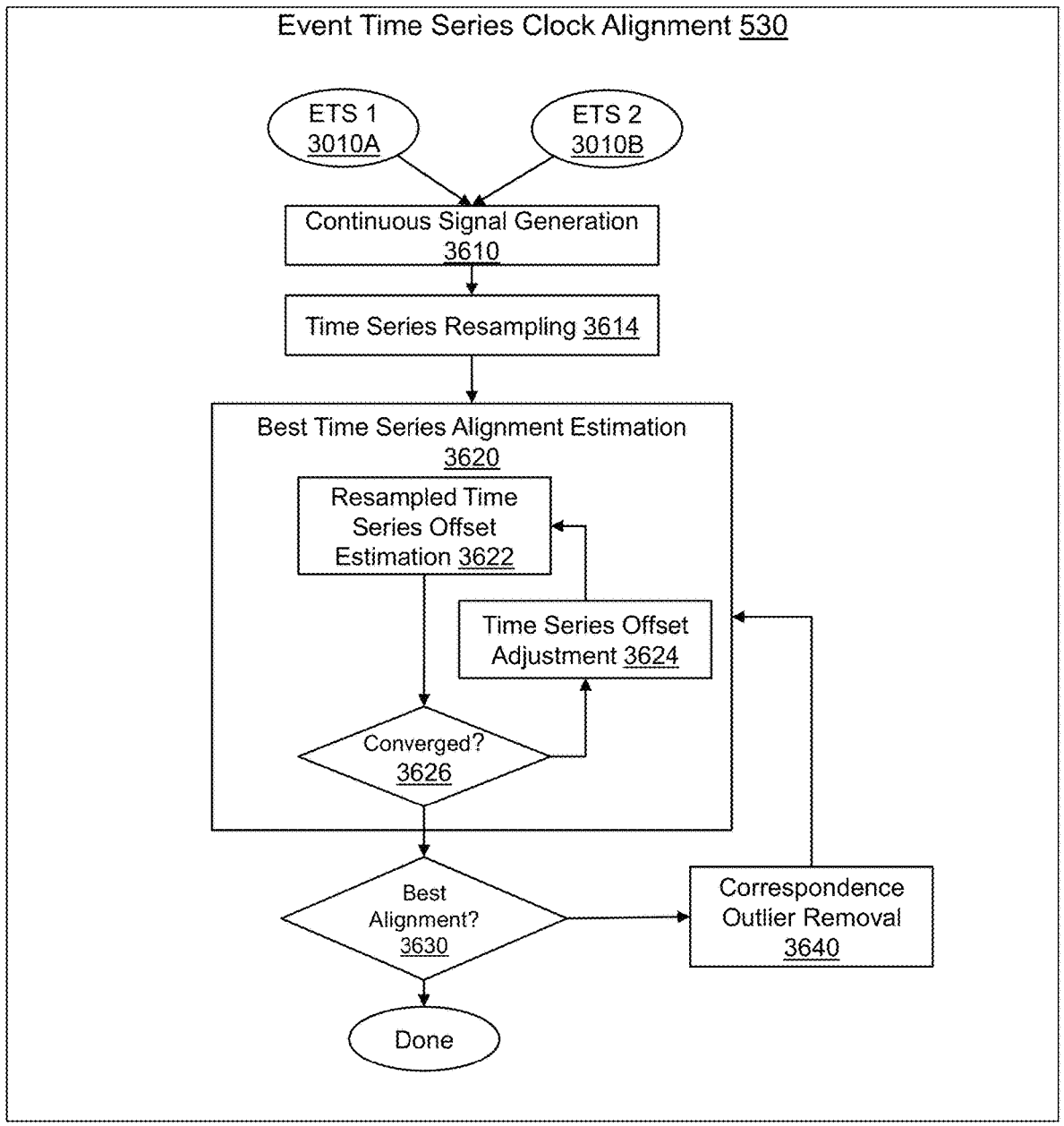
FIG. 36 shows another example embodiment of the Event Time Series Clock Alignment module.

In another embodiment illustrated in FIG. 36, the Event Time Series Clock Alignment 530 module can use ETSes (that are discrete in nature) to construct continuous signal streams for an iterative, dynamic time warping (DTW)-like process to align the clocks for each ETS. Given two discrete ETSes, the DTW-like process can find the best time offset (i.e., best alignment, subject to a threshold) between the two ETSes without outliers.

Figure 37:
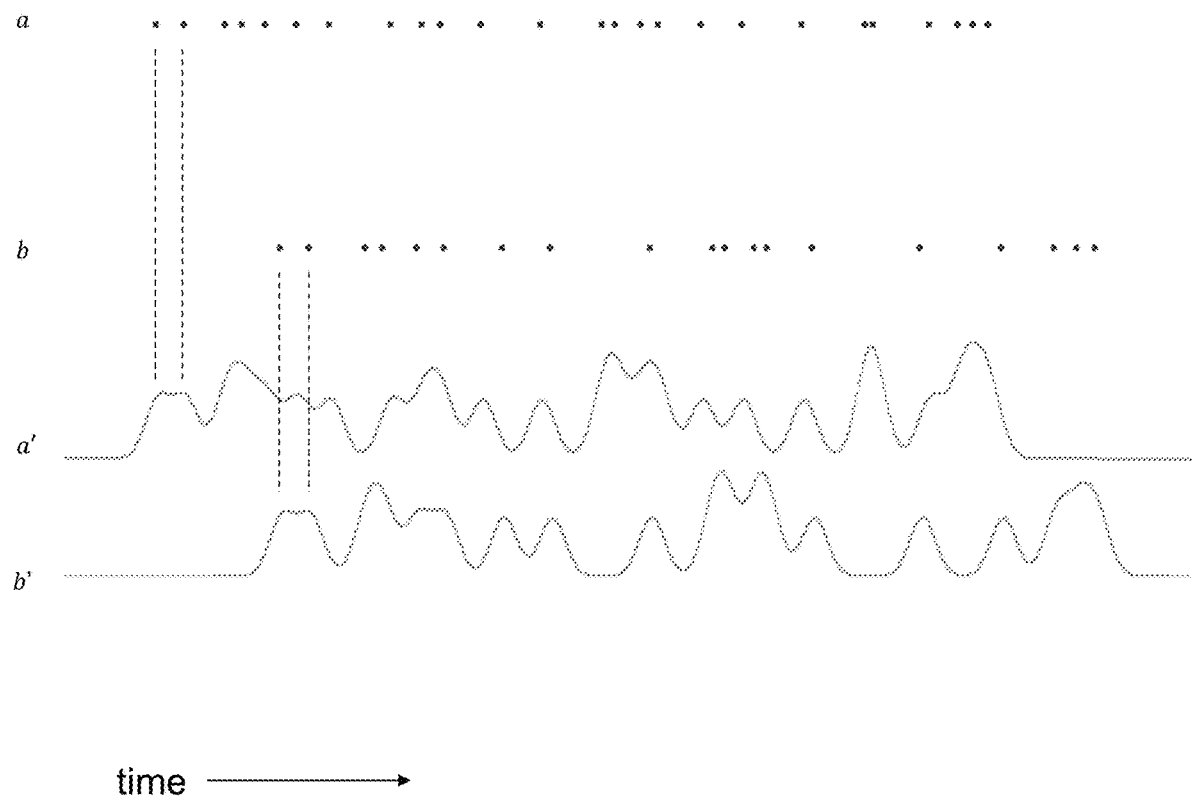
FIG. 37 illustrates a weighted continuous signal stream from each event time series.

In this embodiment, the process can begin as the two ETSes, ETS 1 3010A, a, and ETS 2 3010B, b, can be sent to the Continuous Signal Generation 3610 module. The module can construct continuous signal streams from the set of discrete ETSes by applying a Parzen-window density estimation-like method. The result is a weighted continuous signal stream from each ETS, a' and b', as illustrated in FIG. 37. The weighted continuous signal streams can then be resampled, using the Time Series Resampling 3614 module, to create two new ETSes, a" and b", with uniform sampling.

The process can then proceed as the two uniformly sampled ETSes can be sent to the Best Time Series Alignment Estimation 3620 module. The Resampled Time Series Offset Estimation 3622 module can find a warping path W between each corresponding set of points in i in the ETS, which can be written as a"(W(i).a) and b"(W(i).b). A pair of corresponding points joined by a warping path can be called a correspondence pair.

A DTW-like algorithm takes the weights of the sampled points as an input to find the correspondences between the two ETSes generated by sampling the continuous ETSes. The module can then compute a distance metric, tdiff(a"(W(i).a), b"(W(i).b)), representing the time index disparity between the corresponding points. The average and standard deviation of the time index disparity for all points in i can be calculated.

The change in standard deviation of the time index disparity between a" and b" from the previous iteration can then be tested to see if it is less than a predetermined threshold (convergence check 3626). If not (or, automatically for the first iteration), the Time Series Offset Adjustment 3624 module can adjust the time index of b" by subtracting the average time difference. The process can then resume another iteration starting with the Resampled Time Series Offset Estimation 3622 module. If the change in standard deviation of the time index disparity between a" and b" from the previous iteration is less than a predetermined threshold, the alignment process can be considered converged and the Best Time Series Alignment Estimation 3620 module can be stopped.

The process can then test to determine whether the best alignment of a" and b" has been reached using the Best Alignment 3630 module. The Best Alignment 3630 module can perform two tests, either of which could indicate that the best alignment has been obtained. First, a comparison can be done to determine whether the standard deviation of the time difference disparity for all points in i for the current iteration is greater than the standard deviation of the previous iteration. If that is true, the best alignment had been found in the previous iteration, so the Event Time Series Clock Alignment 530 process could be stopped, and the resulting data from the previous iteration passed to the next step, the Event Matching 540 module.

Also as part of the Best Alignment 3630 step, the process can test whether the remaining number of elements (after outlier removal, described below) in a" and b" are less than a predefined threshold (for example, a threshold could be set to be 50% of the initial number of elements if assuming that at least 50% of the elements must be inliers). If that is true, the best alignment can be considered to be found, so the Event Time Series Clock Alignment 130 process could be stopped, and the resulting data passed to the next step, the Event Matching 140 module.

If neither test from the Best Alignment 3630 step is true, the process can continue with the Correspondence Outlier Removal 3640 module. First, the correspondence pairs can be sorted in ascending order according to the time difference between them. Then, a predefined portion (for example, in an embodiment, 10%) of the correspondence pairs can be removed from consideration. This can be done to ignore outliers that incur a large association cost. Next, all elements in a" and b" that are not referred by the remaining inlier correspondence pairs can be removed from consideration. The process then can resume with another iteration of the Best ETS Alignment Estimation 3620 process.

Figure 38:
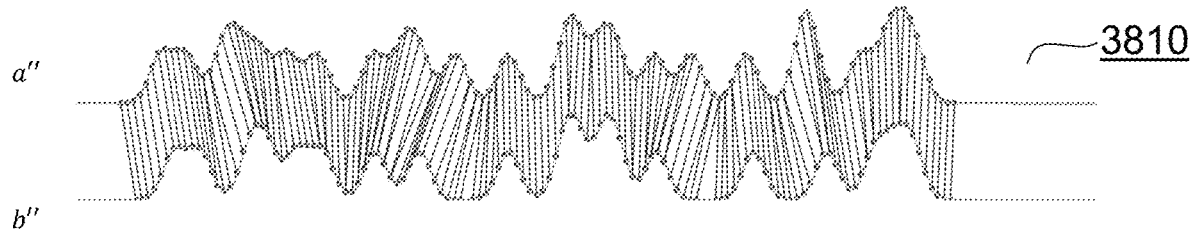
FIG. 38-39 show an example embodiment for selected iterations of an application of the continuous Event Time Series Clock Alignment module.
Figure 38:
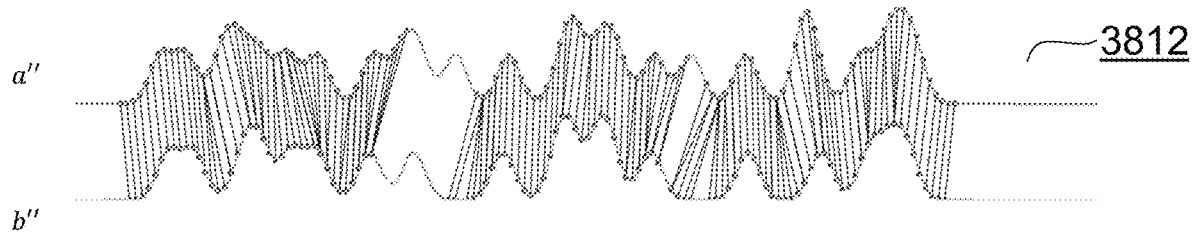
Figure 38:
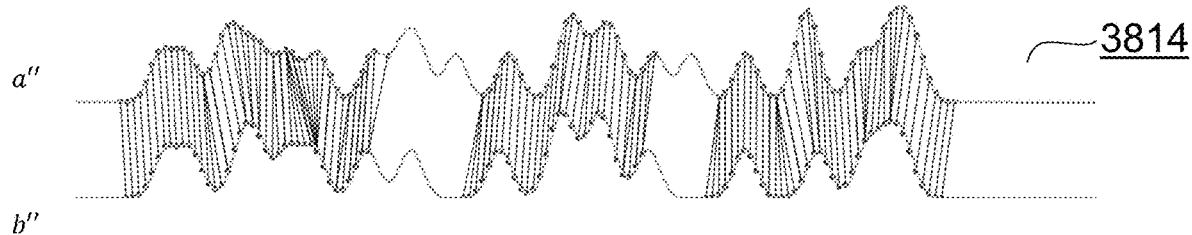
Figure 38:
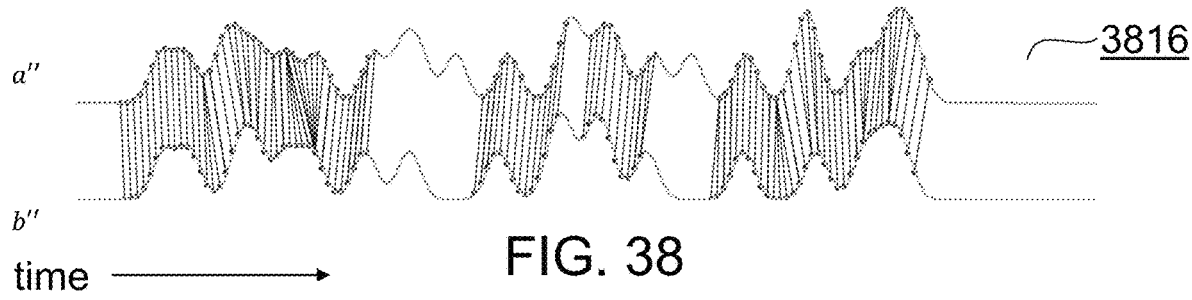
Figure 39:
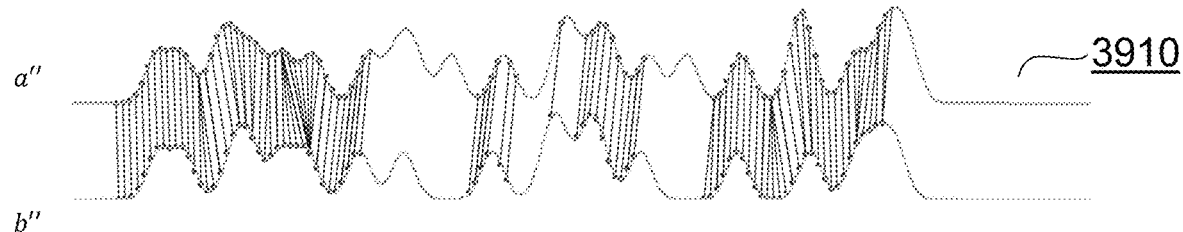
Figure 39:
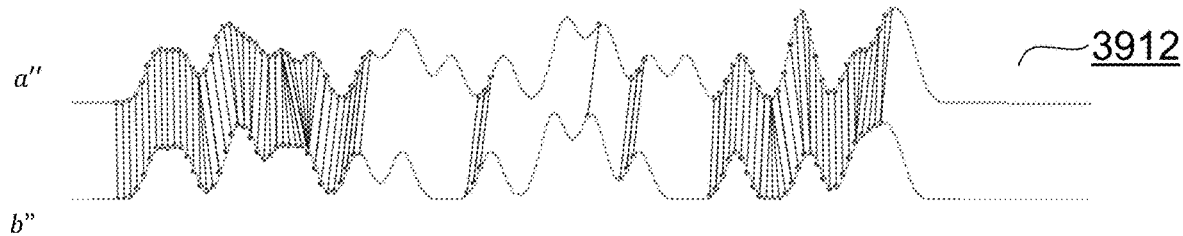
Figure 39:
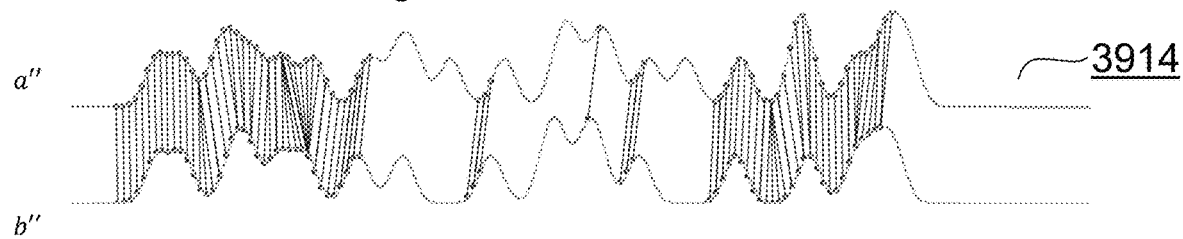

An example embodiment for selected iterations of an application of the continuous Event Time Series Clock Alignment 530 module is shown in FIG. 38 and FIG. 39. The mapping offset for iteration 1 is shown in 3810, as the time index of b" (the lower ETS) is adjusted. For this example, removal of 10% of the correspondence pair outliers, along with the mapping offset for iterations 3, 5, 7, 9, and 11 are shown in 3812, 3814, 3816, 3910, and 3912, respectively. Finally, the final alignment of the ETS is shown in 3914. The process was complete after 13 iterations. The final alignment resulted with an offset of ETS 2 3010B by −194.94 sec. For this example, the ground truth offset was −200 sec.

Event Matching

In an embodiment, the PoS ETS can be called P and the vision-based checkout ETS can be called C. As P can be warped to minimize the offset between P and C (as described above), the new, warped, PoS ETS can be P'.

The Event Matching 540 module can find a match between events of P' and C. It can evaluate each vision-based checkout event in C, where for each event $c_i$, $t(c_i)$ can be the event time (i.e., checkout event time) for $c_i$. Further, $$t(p'_j)$$

can be the time or a PoS event $p'_j$ in P'. The module can loop over each vision-based checkout event in C to find the $p'_j$ that minimizes the absolute time difference to $c_i$, as $$p'_j = \mathrm{argmin}_j \left( |t(p'_j) - t(c_i)| \right).$$

If $$|t(p'_j) - t(c_i)|$$

is larger than a threshold, then there can not be an association to any PoS event, and $c_i$ can be rejected. If $$|t(p'_j) - t(c_i)|$$

is smaller than a threshold, then $c_i$ can be matched to $p'_1$. The loop can continue until there are no events left in C. The resulting match of at least one vision-based checkout event with a PoS event can be a checkout event association pair, $(c_i, p_1)$. It should be noted that there can be a possibility that some vision-based checkout events are not matched to a PoS event, and vice-versa.

Transaction Owner Identification

Figure 40:
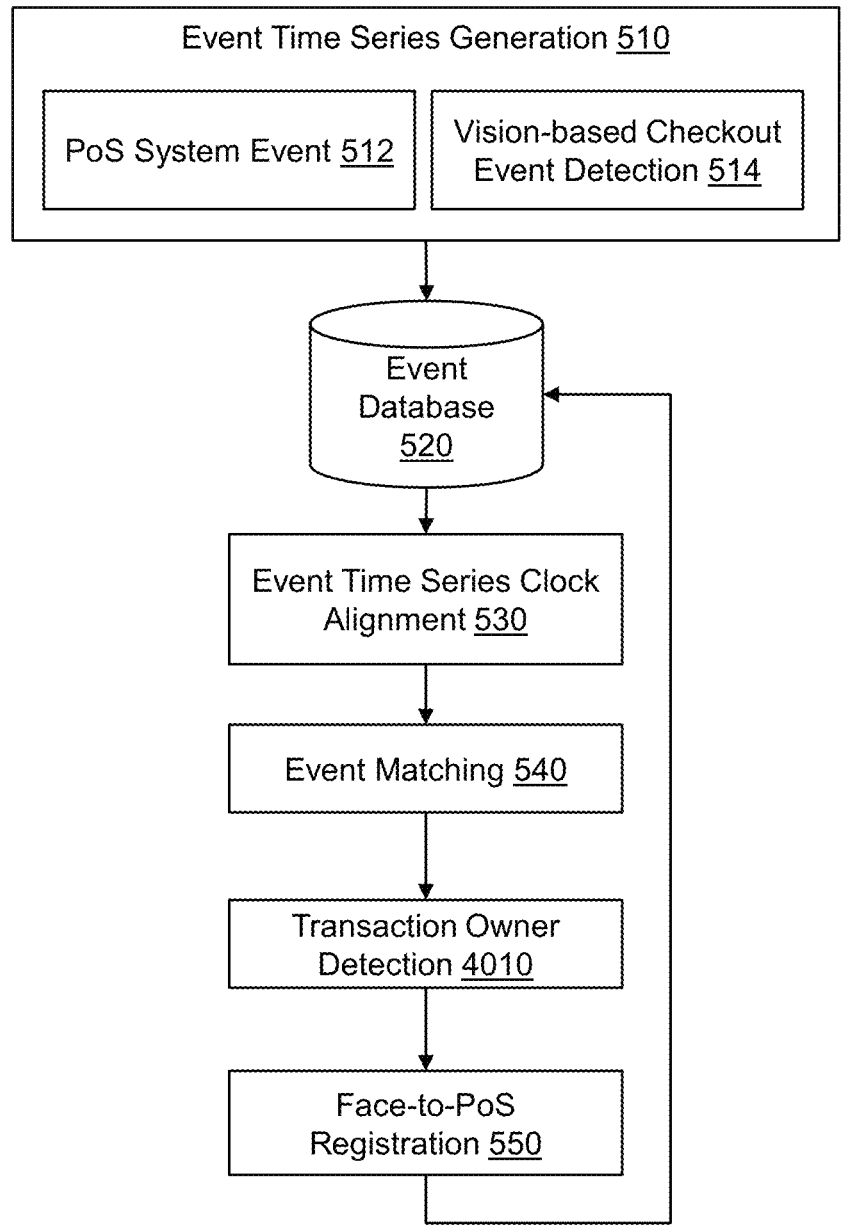
FIG. 40 illustrates an embodiment of the process where an embodiment of the Transaction Owner Detection module can be placed after the Event Matching module.

FIG. 40 illustrates an alternative embodiment of the process where an embodiment of the Transaction Owner Detection 4010 module can be placed after the Event Matching 540 module. In this embodiment, the transaction owner face can be found for each checkout event association pair, $(c_i, p_j)$.

In the embodiment, for each checkout event association pair, $(c_i, p_j)$, the best estimate of the transaction owner in $c_i$ can be found. For each face $f_k$ in $c_i$, a likelihood that the face belongs to the transaction owner can be calculated for $$L(f_k, p'_j) = l_d(f_k) + l_c(f_k, p'_j).$$

Figure 41:
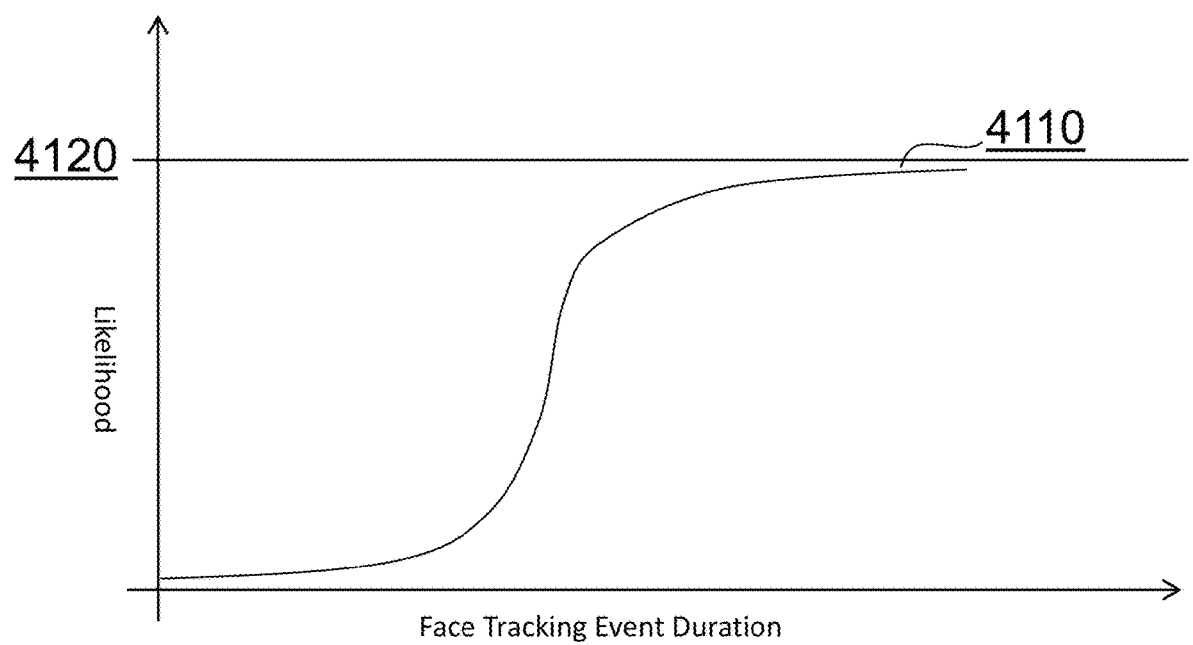
FIG. 41 illustrates the upper limit of the likelihood of face tracking duration.

The calculation of $l_d(f_k)$ is the likelihood based on face tracking duration. In this case, the longer the duration of a tracked face, the higher the likelihood that the tracked face belongs to the transaction owner, to an upper limit. FIG. 41 illustrates the sigmoidal transfer function 4120 that can be used to calculate the likelihood, in an embodiment. The upper limit of the likelihood is shown in 4120. This likelihood can be supported by the rationale that the transaction owner stays inside the tracked checkout area longer than others.

Figure 42:
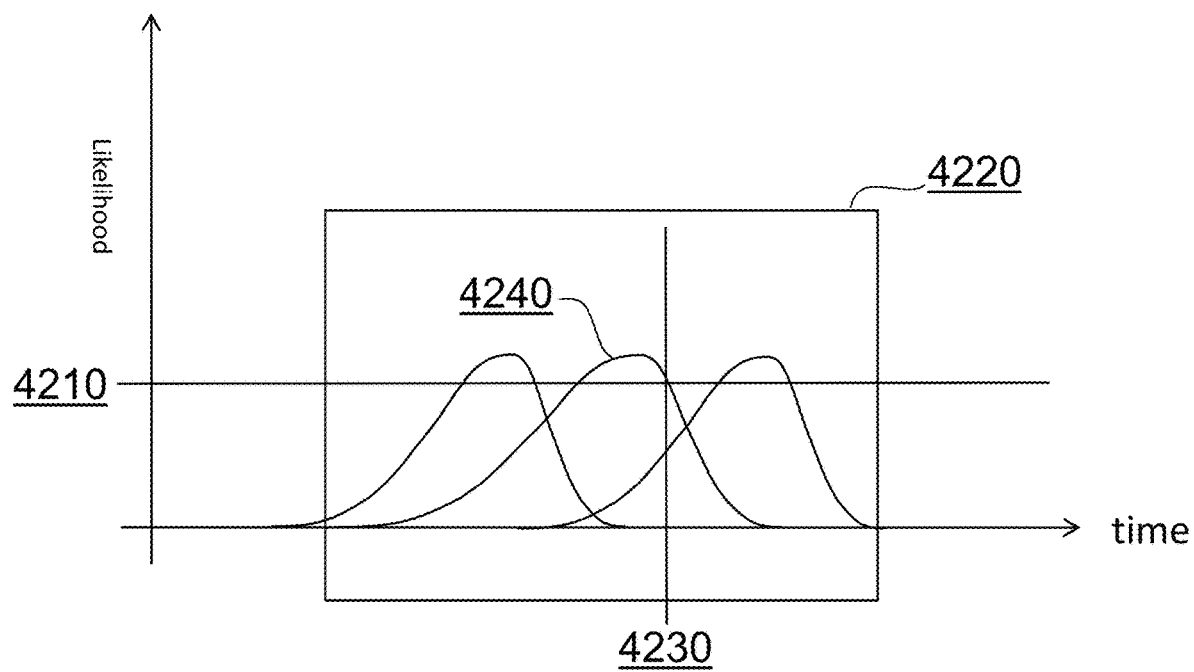
FIG. 42 illustrates the calculation of the likelihood of closeness to the PoS time.

The calculation of $l_c(f_k, p'_j)$ 4210 is the likelihood based on closeness to the PoS time, as illustrated in FIG. 42. In this case, for a checkout event 4220 (consisting of a group of face tracking events 4240; for this example, modeled using the asymmetric likelihood function) matched to a PoS time 4230, the face tracking event 4240 with a transaction time that is closer to the matching PoS time can have a higher likelihood of belonging to the transaction owner.

The face that has the highest likelihood of being the transaction owner, $f_{tO}$, can be calculated using $$f_{to} = \operatorname{argmax}_k (L(f_k, p'_j)).$$

Data indicating the transaction owner can be saved with the checkout association pair for storage in the Event Database 520.

Face-to-PoS Registration

Figure 43:
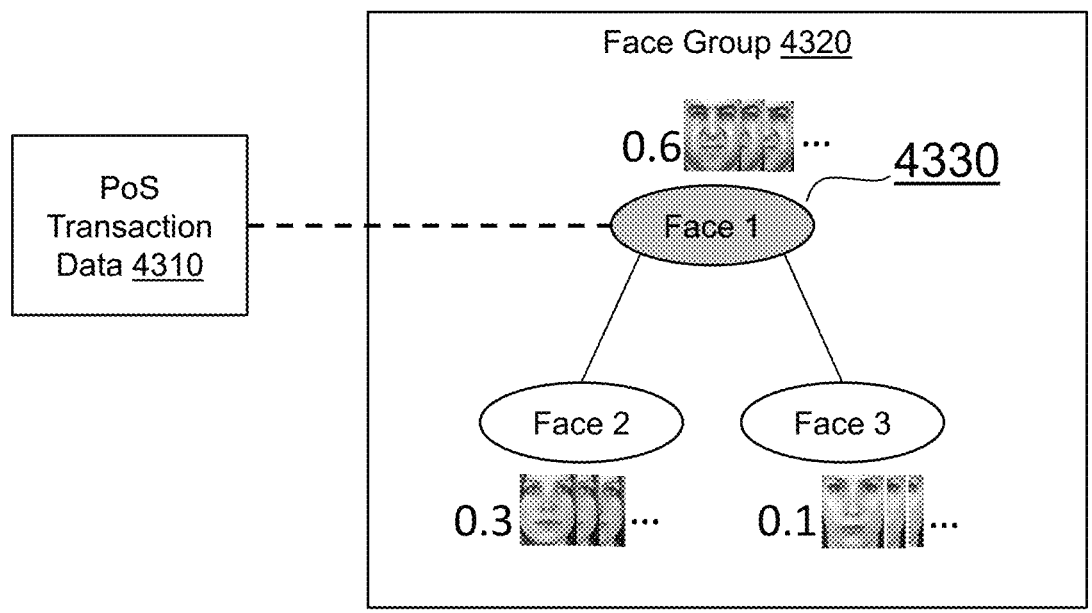
FIG. 43 shows an example of the result of an embodiment of the Face-to-PoS Registration module.

FIG. 43 shows an example of the result of an embodiment of the Face-to-PoS Registration 550 module. In the embodiment, the face or face group matched with each checkout association pair, $(c_i, p_i)$, can be associated. In this example, PoS Transaction Data 4310 can be associated with a Face Group 4320. Further, the PoS transaction data can also be associated with the transaction owner 4330 that is part of the matched face group. The resulting Face-to-PoS association can then be stored in the Event Database 520, then passed to the Database 230.

Mobile-to-PoS Association

Figure 44:
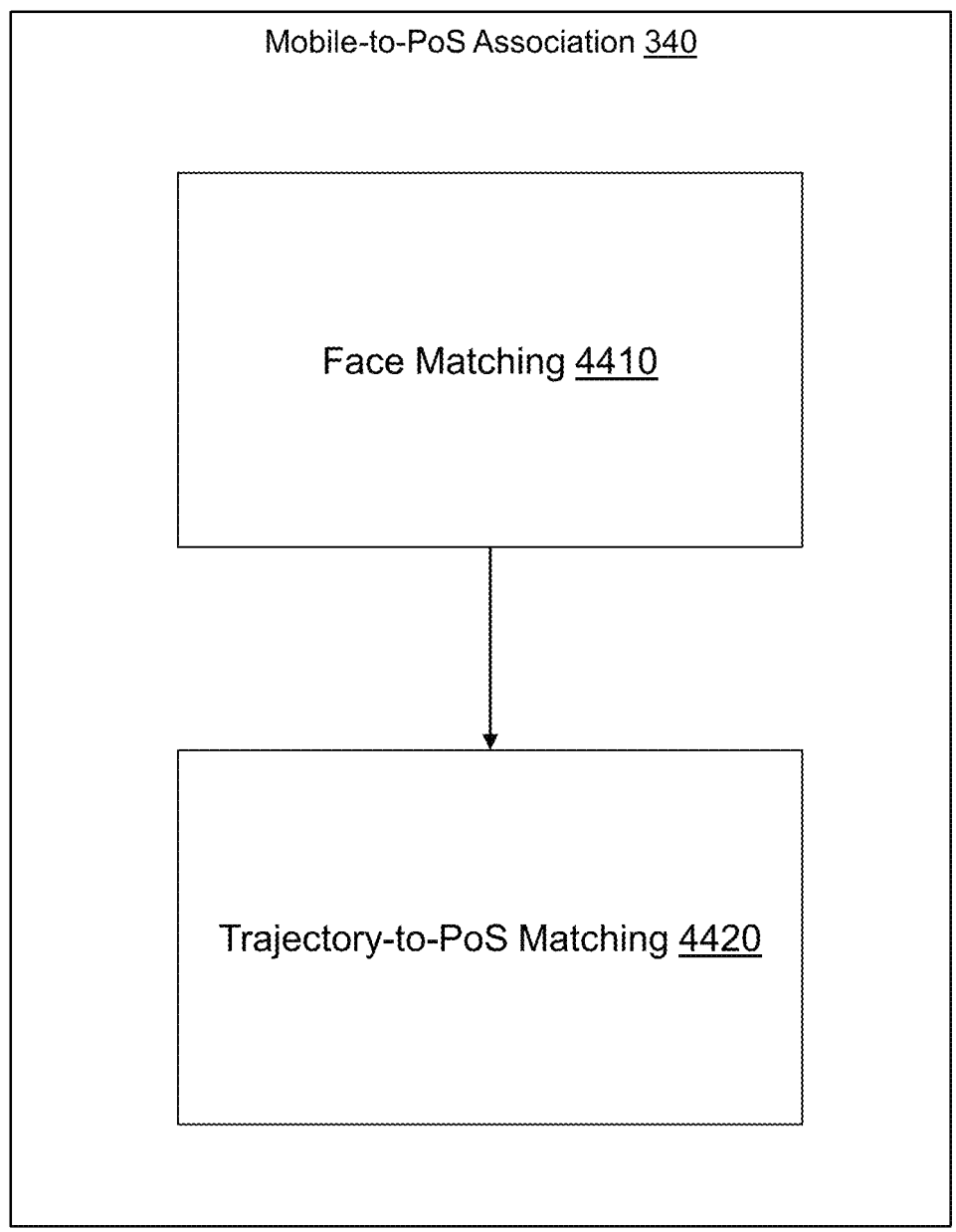
FIG. 44 shows a more detailed block flow diagram of the Mobile-to-PoS Association module.

FIG. 44 illustrates a more detailed embodiment of the Mobile-to-PoS Association 340 module. The module can retrieve data containing face information which is associated with a mobile device (via the Face-to-Mobile Association 320 module) and face information which is associated with PoS transaction data (via the Face-to-PoS Association 330 module). The face information can then be used to associate a mobile device with the PoS transaction data. For each face associated with PoS data from the Face-to-PoS Association 330 module (in some embodiments, the face of the transaction owner), the Face Matching 4410 module can use a facial recognition technique to determine the likelihood of a matching face (contained in the Database 230) that has been previously associated with a mobile device (using the Face-to-Mobile Association 320 module). In some embodiments, the MAC address (or another unique identifier for the tracked mobile device) can be used to filter the list of potential matching faces.

Applications of Embodiments

The Mobile-to-PoS Association process can be used by a retailer to increase the accuracy of a trajectory of a shopper throughout a retail location. The increase in accuracy of the shopper trajectory can be especially useful for embodiments that only track shoppers via wireless devices. The items purchased by the shopper in the PoS transaction can help to refine the calculated trajectory by associating locations visited by the shopper with the location of the items in the store (taking into account the store floor plan and layout that describes the occupancy map of the fixtures and other facilities/equipments where shopper trajectories must not exist).

The Mobile-to-PoS Association process can also be used to associate purchases made in a particular transaction with a shopper without the need for the shopper to opt-in, such as with a loyalty card or program. Since the process can uniquely identify a shopper, that shopper's purchases can be tracked over time (i.e., longitudinally, across multiple visits and across multiple retail locations). Through this tracking, a retailer could provide targeted messages to a shopper based on purchase history.

The Mobile-to-PoS Association process can also be used to generate a profile of a particular shopper based on that shopper's purchase history and shopping behavior (i.e., trajectory). The profile can be generated without any active participation by the shopper, or via an opt-in process. The profile can be used individually for a shopper or aggregated across many shoppers to generate analyses that can be used by a retailer or manufacturer to segment by trip type, shopper behavior, demographics estimation, etc.

Hardware Configuration

One of ordinary skill in the art would recognize that the sets of cameras utilized for the exemplary embodiments, for example as illustrated in FIGS. 1 and 2, can be ordinary surveillance cameras, high-definition cameras, low-cost surveillance cameras, infrared cameras, or other image detection devices. A preferred embodiment of the present invention has the cameras configured as to be installed in the ceiling of a physical location, but one skilled in the art would understand that the cameras could be installed in other locations, such as the walls of the location, behind a mirror, on or associated with a display, aisle or shelf hardware, or railing.

One of ordinary skill in the art would also recognize that the access points (APs) or simply mobile signal sensors (capable of sensing mobile radio signals including WiFi and Bluetooth), for example as illustrated in FIG. 1, can be located in plain view of persons in a physical location, but also out of sight in a ceiling or other fixture. The AP can be a consumer AP device, commercial AP device, beacon device, or any other device capable of operating as an access point or a sensor for Wi-Fi, Bluetooth, or other wireless modality.

Both the cameras and AP hardware can be connected by a wired network, including, but not limited to, an Ethernet based network. The cameras and AP hardware can also be connected by a wireless network, including, but not limited to, a Wi-Fi network, Bluetooth network, nearfield communications (NFC) network, or other type of wireless network. A wired or wireless network can be controlled by a central server or each device can operate as an independent, "Internet of things" device. The network can be connected to the Internet to transfer data, including, but not limited to, raw data and processed data and analytics, to a remote location.

The computing hardware utilized to implement the processes and modules used in the present invention can be configured and controlled via a user-input device, including, but not limited to, a keyboard, mouse, trackpad, trackball, or remote control. Additionally, the hardware can be configured and controlled via remote access through a secure Internet connection. Any data captured and created, including both raw data and processed data and analytics, by the system can be output to a user using a display, printout, or transmitted to a remote location for further analysis.

Figure 45:
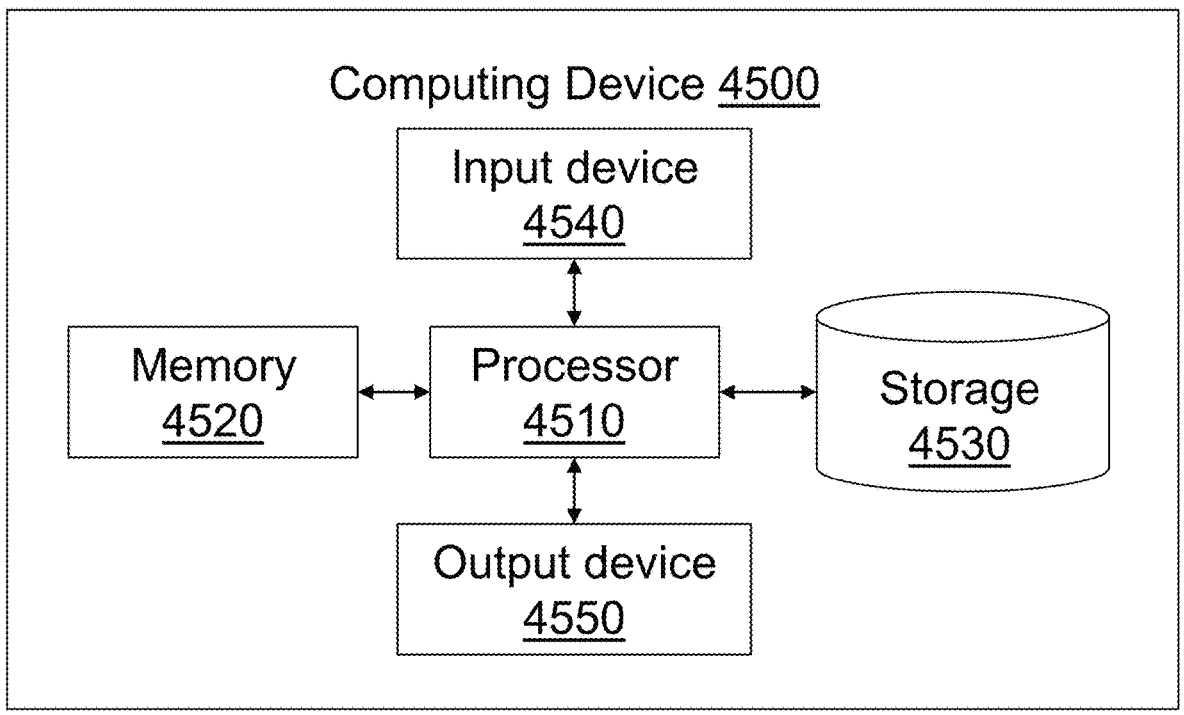
FIG. 45 shows an example computing device illustration.

FIG. 45 shows an example of a generic computer device or a generic mobile computer device, which may be used to implement the processes and modules of the present invention. The computer devices can include many forms of devices, such as desktops, workstations, servers, laptops, personal computers, personal digital assistants, single board computers such as the Raspberry Pi, and other computing devices. Mobile computing devices can include cellular telephones, smartphones, personal digital assistants, or other mobile devices. It should be understood that the computing devices and mobile computing devices listed are exemplary, and not intended to limit the implementation of the processes and modules disclosed in the present invention.

The computing device 4500 includes a processor 4510, memory 4520 (such as Random Access Memory or RAM), storage 4530 (such as a hard disk drive), input device 4540 (such as a keyboard, trackball, trackpad, or mouse), and output device 4550 (such as a CRT, LCD, or other type of display device, and an auditory device such as speakers).

While the above description contains much specificity, these should not be construed as limitations on the scope of the invention, but as exemplifications of the presently preferred embodiments thereof. Many other ramifications and variations are possible within the teachings of the invention. Thus, the scope of the invention should be determined by the appended claims and their legal equivalents, and not by the examples given.

We claim:

1. A method for associating a mobile device with Point-of-Sale (PoS) data utilizing at least a camera, at least a mobile signal sensor, and at least a processor for the association comprising the following steps:
   a. detecting the presence of a mobile device using a mobile signal sensor and tracking the movements of the mobile device as a shopper carrying the device moves throughout a location using a Mobile Signal-based Tracking module,
   b. associating at least an image of the face of a shopper with the mobile device using a Face-to-Mobile Association module, wherein a unique identifier of the mobile device is the MAC address of the radio of the mobile device, and wherein the Face to Mobile Matching module uses the MAC address of the device to match a particular face group to a particular mobile device,
   c. associating at least an image of the face of a shopper with PoS transaction data using a Face-to-PoS Association module,
   d. storing data captured by Mobile Signal-based Tracking module, Face-to-Mobile Association module, and Face-to-PoS Association module in a database, and
   e. associating the mobile device to the PoS data using a Mobile-to-PoS Association module, wherein the Mobile-to-PoS Association module further comprises matching the image of the face of the shopper that is associated with the PoS transaction data with the image of the face of the shopper that is associated with the mobile device with, and wherein the image of the face of the shopper that is associated with the mobile device is contained in a database of images collected over time.

2. The method of claim 1, wherein the association of the mobile device with the PoS data is used to create a profile of the shopper that is used to generate an analysis by a retailer or manufacturer regarding segmentation comprising one or more of trip type, shopper behavior, or demographics.

3. The method of claim 2, wherein the matching of images is computed as a likelihood that the face images are of the same shopper and are performed using at least a facial recognition technique.

4. The method of claim 1, wherein detecting and tracking the mobile device using the Mobile Signal-based Tracking module further comprises receiving a signal, MAC address, and received signal strength (RSS) from the mobile device, converting the RSS from the mobile device into a distance using a pre-learned RSS-to-distance mapping function, calculating a location of the mobile device using a trilateration method, and forming a trajectory for the mobile device based on the location of the device as the shopper moves through the location.

5. The method of claim 1, wherein the Face-to-Mobile Association module further comprises:
   a. detecting a unique identifier of the mobile device using the mobile signal sensor for at least one physical location using a Mobile Device Visit Detection module,
   b. capturing a plurality of input images of a face of at least a person at the location using at least a camera using a Candidate Face Collection module,
   c. storing the unique identifier of the mobile device and plurality of input images in a database,
   d. clustering the plurality of input images into a face group using a Face Clustering module, and
   e. matching a particular face group to a particular mobile device using a Face to Mobile Matching module.

6. The method of claim 1, wherein the Face-to-Mobile Association module further comprises:
   a. generating a first event time series using an Event Time Series Generation module,
   b. generating a second event time series using the Event Time Series Generation module,
   c. aligning the first event time series with the second event time series based on the dynamic time disparity between the time series, using an Event Time Series Clock Alignment module,
   d. matching first time series events with second time series events based on the alignment of the time series, using an Event Matching module,
   e. registering face images from a series of checkout events to a series of PoS events using a Face-to-PoS Registration module, and
   f. storing the time series and registration data in a database.

7. The method of claim 6, wherein the first event time series is comprised of a plurality of checkout events and associated timestamps, wherein the second event time series is comprised of a plurality of PoS events, wherein the first event time series is further comprised of a set of face images along with a timestamp for each image, and wherein the face images are of persons identified as participating in a checkout event.

8. The method of claim 6, wherein the Event Time Series Clock Alignment module further comprises the steps of:
   a. performing a dynamic time warping to find a warping path between corresponding events between the first event time series and the second event time series,
   b. checking for convergence by determining whether the standard deviation of a time difference between corresponding events in the first event time series and the second event time series is less than a predetermined threshold,
   c. adjusting the time index of the second event time series based on the time disparity between the event time series, d. testing the alignment of the time series to see if the best alignment has been obtained,
e. sorting the corresponding events based on the time disparity between events, and removing outliers that have a time disparity greater than a threshold, and
f. repeating the Event Time Series Clock Alignment module steps until the best alignment is obtained.

9. A system for associating a mobile device with Point-of-Sale (PoS) data utilizing at least a camera, at least a mobile signal sensor, and at least a processor for the association comprising the following steps:
   a. detecting the presence of a mobile device using a mobile signal sensor and tracking the movements of the mobile device as a shopper carrying the device moves throughout a location using a Mobile Signal-based Tracking module,
   b. associating at least an image of the face of a shopper with the mobile device using a Face-to-Mobile Association module, a unique identifier of the mobile device is the MAC address of the radio of the mobile device, and wherein the Face to Mobile Matching module uses the MAC address of the device to match a particular face group to a particular mobile device,
   c. associating at least an image of the face of a shopper with PoS transaction data using a Face-to-PoS Association module,
   d. storing data captured by Mobile Signal-based Tracking module, Face-to-Mobile Association module, and Face-to-PoS Association module in a database, and
   e. associating the mobile device to the PoS data using a Mobile-to-PoS Association module, wherein the Mobile-to-PoS Association module further comprises matching the image of the face of the shopper that is associated with the PoS transaction data with the image of the face of the shopper that is associated with the mobile device with, and wherein the image of the face of the shopper that is associated with the mobile device is contained in a database of images collected over time.

10. The system of claim 9, wherein the association of the mobile device with the PoS data is used to create a profile of the shopper that is used to generate an analysis by a retailer or manufacturer regarding segmentation comprising one or more of trip type, shopper behavior, or demographics.

11. The system of claim 10, wherein the matching of images is computed as a likelihood that the face images are of the same shopper and are performed using at least a facial recognition technique.

12. The system of claim 9, wherein detecting and tracking the mobile device using the Mobile Signal-based Tracking module further comprises receiving a signal, MAC address, and received signal strength (RSS) from the mobile device, converting the RSS from the mobile device into a distance using a pre-learned RSS-to-distance mapping function, calculating a location of the mobile device using a trilateration method, and forming a trajectory for the mobile device based on the location of the device as the shopper moves through the location.

13. The system of claim 9, wherein the Face-to-Mobile Association module further comprises:
   a. detecting a unique identifier of the mobile device using the mobile signal sensor for at least one physical location using a Mobile Device Visit Detection module,
   b. capturing a plurality of input images of a face of at least a person at the location using at least a camera using a Candidate Face Collection module,
   c. storing the unique identifier of the mobile device and plurality of input images in a database,
   d. clustering the plurality of input images into a face group using a Face Clustering module, and
   e. matching a particular face group to a particular mobile device using a Face to Mobile Matching module.

14. The system of claim 9, wherein the Face-to-Mobile Association module further comprises:
   a. generating a first event time series using an Event Time Series Generation module,
   b. generating a second event time series using the Event Time Series Generation module,
   c. aligning the first event time series with the second event time series based on the dynamic time disparity between the time series, using an Event Time Series Clock Alignment module,
   d. matching first time series events with second time series events based on the alignment of the time series, using an Event Matching module,
   e. registering face images from a series of checkout events to a series of PoS events using a Face-to-PoS Registration module, and
   f. storing the time series and registration data in a database.

15. The system of claim 14, wherein the first event time series is comprised of a plurality of checkout events and associated timestamps, wherein the second event time series is comprised of a plurality of PoS events, wherein the first event time series is further comprised of a set of face images along with a timestamp for each image, and wherein the face images are of persons identified as participating in a checkout event.

16. The system of claim 14, wherein the Event Time Series Clock Alignment module further comprises the steps of:
   a. performing a dynamic time warping to find a warping path between corresponding events between the first event time series and the second event time series,
   b. checking for convergence by determining whether the standard deviation of a time difference between corresponding events in the first event time series and the second event time series is less than a predetermined threshold,
   c. adjusting the time index of the second event time series based on the time disparity between the event time series,
   d. testing the alignment of the time series to see if the best alignment has been obtained,
   e. sorting the corresponding events based on the time disparity between events, and removing outliers that have a time disparity greater than a threshold, and
   f. repeating the Event Time Series Clock Alignment module steps until the best alignment is obtained.

* * * * *